(12) United States Patent
Iyoda et al.

(10) Patent No.: US 10,449,820 B2
(45) Date of Patent: Oct. 22, 2019

(54) VEHICLE-HEIGHT CONTROL SYSTEM AND PRESSURE SOURCE DEVICE

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Ikuhide Iyoda, Nisshin (JP); Takayuki Tachi, Anjo (JP); Hideki Ohashi, Chiryu (JP); Katsuyuki Sano, Miyoshi (JP); Jun Tokumitsu, Toyota (JP); Ryo Kanda, Nissin (JP); Shogo Tanaka, Toyota (JP); Masao Ikeya, Toyota (JP); Masaaki Oishi, Takahama (JP)

(73) Assignees: TOYOTA JIDOSHA KABUSHIKI KAISHA, Toyota (JP); AISIN SEIKI KABUSHIKI KAISHA, Kariya (JP)

( * ) Notice: Subject to any disclaimer, the term of this patent is extended or adjusted under 35 U.S.C. 154(b) by 270 days.

(21) Appl. No.: 15/436,390

(22) Filed: Feb. 17, 2017

(65) Prior Publication Data

US 2017/0274720 A1    Sep. 28, 2017

(30) Foreign Application Priority Data

Mar. 22, 2016   (JP) ................................ 2016-057100

(51) Int. Cl.
*B60G 17/015* (2006.01)
*F04B 35/04* (2006.01)
(Continued)

(52) U.S. Cl.
CPC ....... *B60G 17/0155* (2013.01); *B60G 17/056* (2013.01); *F04B 35/04* (2013.01);
(Continued)

(58) Field of Classification Search
CPC ............ B60G 17/0155; B60G 17/0523; B60G 17/0525; B60G 17/0528; B60G 17/056;
(Continued)

(56) References Cited

U.S. PATENT DOCUMENTS 9,273,700 B2 *   3/2016   Bergennann ....... B60G 17/0523
9,783,018 B2 *   10/2017   Ogino .................... B60G 11/27
(Continued)

FOREIGN PATENT DOCUMENTS

DE    10 2008 021 818 A1    11/2009
DE    10 2012 001 734 A1    8/2013
(Continued)

OTHER PUBLICATIONS

Japanese Patent Application No. 2017-021520 filed on Feb. 8, 2017.
U.S. Appl. No. 15/465,115, filed Mar. 21, 2017.

*Primary Examiner* — Laura Freedman
(74) *Attorney, Agent, or Firm* — Oliff PLC

(57) ABSTRACT

A vehicle-height control system includes: a fluid supply and discharge device including a compressor device and a tank storing fluid pressurized by the compressor device; a vehicle-height control actuator corresponding to a wheel and connected to the fluid supply and discharge device; a vehicle height controller that controls a vehicle height for the wheel by controlling the fluid supply and discharge device to control supply and discharge of fluid to and from the vehicle-height control actuator; a tank pressure controller that controls a tank pressure; and a fluid supply controller that supplies the fluid to a low pressure portion by controlling the fluid supply and discharge device at start and/or termination of at least one of control executed by the vehicle height controller and control executed by the tank pressure controller. The low pressure portion is at least a portion of the fluid supply and discharge device.

9 Claims, 27 Drawing Sheets

(51) Int. Cl.
*F04B 41/02* (2006.01)
*F15B 11/16* (2006.01)
*B60G 17/056* (2006.01)

(52) U.S. Cl.
CPC .............. *F04B 41/02* (2013.01); *F15B 11/16* (2013.01); *B60G 2202/412* (2013.01); *B60G 2400/50* (2013.01); *B60G 2500/30* (2013.01); *F15B 2211/71* (2013.01); *F15B 2211/7656* (2013.01)

(58) Field of Classification Search
CPC .......... B60G 17/0565; B60G 2202/152; B60G 2202/412; B60G 2400/50; B60G 2400/51222; B60G 13/10; B60G 2500/2014; B60G 2500/202; B60G 2500/204; B60G 2500/205; B60G 2500/30; F04B 35/04; F04B 41/02; F15B 11/16; F15B 2211/71; F15B 2211/7656
See application file for complete search history.

(56) References Cited

U.S. PATENT DOCUMENTS

| | | | | |
|---|---|---|---|---|
| 9,821,622 | B2 * | 11/2017 | Ohashi | ................... B60G 11/27 |
| 9,931,900 | B2 * | 4/2018 | Oishi | ..................... B60G 11/27 |
| 10,081,224 | B2 * | 9/2018 | Ohashi | ............... B60G 17/0155 |
| 10,086,672 | B2 * | 10/2018 | Ohashi | ............... B60G 17/0523 |
| 10,160,277 | B2 * | 12/2018 | Ohashi | ............... B60G 17/0525 |
| 2005/0012293 | A1 | 1/2005 | Misawa | |
| 2005/0035562 | A1 * | 2/2005 | Meier | ................ B60G 17/0155 |
| | | | | 280/6.15 |
| 2010/0270760 | A1 * | 10/2010 | Lloyd | .................... B60G 11/27 |
| | | | | 280/5.514 |
| 2011/0049819 | A1 | 3/2011 | Matthies et al. | |
| 2013/0192681 | A1 | 8/2013 | Meier | |
| 2015/0151600 | A1 | 6/2015 | Suzuki et al. | |
| 2015/0151601 | A1 | 6/2015 | Kondo et al. | |
| 2015/0151602 | A1 | 6/2015 | Suzuki et al. | |
| 2015/0151603 | A1 | 6/2015 | Kondo et al. | |
| 2017/0259639 | A1 * | 9/2017 | Ohashi | ................... B60G 11/27 |
| 2017/0259640 | A1 * | 9/2017 | Ohashi | ............... B60G 17/0155 |
| 2017/0259641 | A1 * | 9/2017 | Ohashi | ............... B60G 17/0155 |
| 2017/0274723 | A1 * | 9/2017 | Tanaka | ................ B60G 17/019 |
| 2018/0029432 | A1 * | 2/2018 | Kondo | ............... B60G 17/0155 |
| 2019/0061458 | A1 * | 2/2019 | Tanaka | ............... B60G 17/0525 |
| 2019/0176562 | A1 * | 6/2019 | Ohashi | ............... B60G 17/0523 |

FOREIGN PATENT DOCUMENTS

| | | |
|---|---|---|
| EP | 1 484 204 A2 | 12/2004 |
| EP | 2 878 462 A2 | 6/2015 |
| EP | 2 878 463 A2 | 6/2015 |
| EP | 2 878 464 A2 | 6/2015 |
| EP | 2 878 465 A2 | 6/2015 |
| JP | S59-130718 A | 7/1984 |
| JP | H03-70615 A | 3/1991 |
| JP | 2001-225627 A | 8/2001 |
| JP | 2007203974 A * | 8/2007 |
| JP | 2015-105016 A | 6/2015 |
| JP | 2017-095028 A | 6/2017 |
| WO | 2004/087445 A1 | 10/2004 |

* cited by examiner

VEHICLE-HEIGHT CONTROL SYSTEM AND PRESSURE SOURCE DEVICE

CROSS REFERENCE TO RELATED APPLICATION

The present application claims priority from Japanese Patent Application No. 2016-057100, which was filed on Mar. 22, 2016, the disclosure of which is herein incorporated by reference in its entirety.

BACKGROUND

The following disclosure relates to a pressure source device and a vehicle-height control system including the pressure source device.

Patent Document 1 (Japanese Patent Application Publication No. 3-70615) discloses an air supply and discharge device including a tank, and a vehicle-height control system including the air supply and discharge device. This air supply and discharge device is configured such that a compressor device is actuated when the pressure of air stored in the tank becomes lower than a lower limit value of a set range, and the compressor device is stopped when the pressure of air stored in the tank reaches an upper limit value of the set range. In the vehicle-height control system, the compressor device is operated to increase vehicle heights for respective wheels by supplying air from the tank to vehicle-height control actuators provided for the respective wheels. Also, the compressor device is operated to discharge air from the vehicle-height control actuators to the atmosphere to lower the vehicle heights.

SUMMARY

Accordingly, an aspect of the disclosure relates to a pressure source device including a tank and a compressor device and capable of suppressing sounds and vibrations caused at at least one of start and stop of a compressor, and/or capable of reducing a delay in control executed by the pressure source device using a pressure medium.

In one aspect of the disclosure, a pressure source device is configured to supply a pressure medium to a low pressure portion at at least one of start and termination of at least one of tank pressure control and control using a pressure medium. Examples of the low pressure portion include: a portion at which the pressure of the pressure medium is estimated to be lower than or equal to a set pressure; and a portion at which the pressure of the pressure medium is estimated to be relatively low. The supply of the pressure medium to the low pressure portion eliminates the low pressure portion or increases the pressure of the pressure medium in the low pressure portion. As a result, it is possible to reduce a pressure difference between an intake-side portion and a discharge-side portion of the compressor, thereby suppressing sounds and vibrations caused in the pressure source device at actuation and stop of the compressor. It is also possible to reduce a delay in control executed by the pressure source device using the pressure medium due to the low pressure portion.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described vehicle-height control systems according to embodiments by reference to the drawings. The present vehicle-height control systems include pressure source devices according to embodiments. Air is utilized as a pressure medium and fluid in the embodiments.

First Embodiment

Figure 1:
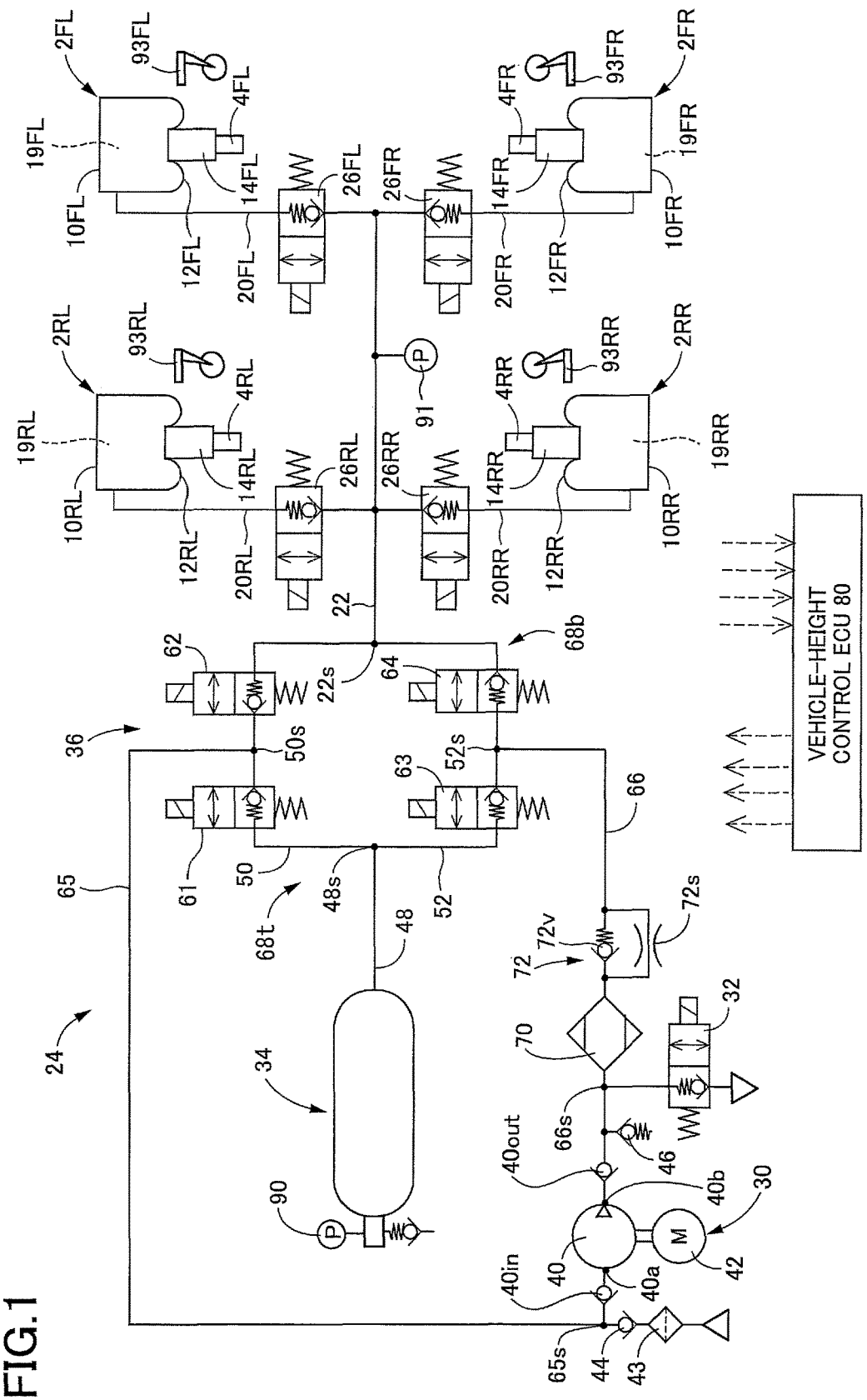
FIG. 1 is a circuit diagram of a vehicle-height control system according to a first embodiment.

In a vehicle-height control system according to a first embodiment, as illustrated in FIG. 1, air cylinders 2FL, 2FR, 2RL, 2RR each as a vehicle-height control actuator and shock absorbers 4FL, 4FR, 4RL, 4RR are provided in parallel between a wheel-side member and a vehicle-body-side member, not illustrated. The air cylinders 2FL, 2FR, 2RL, 2RR respectively correspond to front left, front right, rear left, and rear right wheels provided on a vehicle. Likewise, the shock absorbers 4FL, 4FR, 4RL, 4RR respectively correspond to the front left, front right, rear left, and rear right wheels. Each of the shock absorbers 4FL, 4FR, 4RL, 4RR includes a cylinder body provided on the wheel-side member and a piston provided on the vehicle-body-side member. In the following description, each of the air cylinders 2 and other similar components will be referred with a corresponding one of suffixes (FL, FR, RL, RR) indicative of the respective wheels where the air cylinders 2 and other similar component should be distinguished by their respective wheel positions. On the other hand, where these devices are collectively referred, or the distinction is not required, each of the air cylinders 2 and other similar components will be referred without such suffixes. Each of the air cylinders 2 includes: a cylinder body 10 provided on the vehicle-body-side member; a diaphragm 12 fixed to the cylinder body 10; and an air piston 14 provided on the diaphragm 12 and the cylinder body of the corresponding shock absorber 4 so as to be movable together with the diaphragm 12 and the cylinder body in the up and down direction. Interiors of these components serve as an air chamber 19 as a pressure medium chamber. When air is supplied to or discharged from the air chamber 19, the air piston 14 is moved relative to the cylinder body 10 in the up and down direction. This movement moves the cylinder body and the piston of the shock absorber 4 relative to each other in the up and down direction. As a result, a distance between the wheel-side member and the vehicle-body-side member is changed, that is, a vehicle height is changed.

An air supply and discharge device 24 as a fluid supply and discharge device is connected to the air chambers 19 of the respective air cylinders 2, via respective individual passages 20 and a common passage 22. Vehicle-height control valves 26 are provided on the respective individual passages 20. Each of the vehicle-height control valves 26 is a normally closed electromagnetic valve. When being in an open state, the vehicle-height control valve 26 allows flow of air in opposite directions. When being in a closed state, the vehicle-height control valve 26 prevents flow of air in a direction directed from the air chambers 19 to the common passage 22 but allows flow of air in the direction directed from the common passage 22 to the air chambers 19 when a pressure of air in the common passage 22 becomes higher than a pressure of air in the air chamber 19 by a set pressure.

The air supply and discharge device 24 includes a compressor device 30, an air discharge valve 32 as one example of a discharge valve, a tank 34, a switching device 36, an intake valve 44 as a supply valve, and a relief valve 46. The compressor device 30 includes a compressor 40 and an electric motor 42 configured to drive the compressor 40 to operate it. In the present embodiment, a plunger pump is used as the compressor 40. When a discharge pressure of the compressor 40 has increased, air is discharged to the atmosphere via the relief valve 46. A intake valve 40in and a discharge valve 40out each as a check valve are provided respectively on an intake side and a discharge side of the compressor 40 to prevent air flow from the discharge side toward the intake side. The tank 34 stores air in a pressurized state. A pressure of the air in the tank 34 (hereinafter may be referred to as "tank pressure") increases with increase in amount of air stored in the tank 34.

The switching device 36 is provided among the common passage 22, the tank 34, and the compressor device 30 to switch a direction in which air flows among them. The switching device 36 includes a first passage 50, a second passage 52, and circuit valves 61-64 each as an electromagnetic valve. As illustrated in FIG. 1, the common passage 22 and a tank passage 48 connected to the tank 34 are connected to each other by the first passage 50 and the second passage 52 which are provided in parallel. The circuit valves 61, 62 are provided on the first passage 50 in series. The circuit valves 63, 64 are provided on the second passage 52 in series. The tank passage 48 is connected to the first passage 50 and the second passage 52 at a connecting portion 48s. The common passage 22 is connected to the first passage 50 and the second passage 52 at a connecting portion 22s. A third passage 65 is connected to an intake-side portion 40a including an intake-side port of the compressor 40 and is connected to the first passage 50 at a connecting portion 50s located between the two circuit valves 61, 62. A fourth passage 66 is connected to a discharge-side portion 40b including a discharge-side port of the compressor 40 and is connected to the second passage 52 at a connecting portion 52s located between the two circuit valves 63, 64. It is noted that the third passage 65 is one example of an intake passage, and the fourth passage 66 is one example of a discharge passage. A high-pressure coupling passage 68t includes: a portion of the first passage 50 between the connecting portion 50s and the connecting portion 48s; and a portion of the second passage 52 between the connecting portion 52s and the connecting portion 48s. A low-pressure coupling passage 68b includes: a portion of the first passage 50 between the connecting portion 50s and the connecting portion 22s; and a portion of the second passage 52 between the connecting portion 52s and the connecting portion 22s. The circuit valves 61, 63 are located on the high-pressure coupling passage 68t, and the circuit valves 62, 64 are located on the low-pressure coupling passage 68b. Each of the circuit valves 61, 63 may be referred to as "high-pressure-side electromagnetic valve", and each of the circuit valves 62, 64 may be referred to as "low-pressure-side electromagnetic valve". Each of the circuit valves 61-64 is a normally closed valve. When being in an open state, each of the circuit valves 61-64 allows flow of air in opposite directions. When being in a closed state, each of the circuit valves 61-64 prevents flow of air from one side to the other side but allows flow of air from the other side to the one side when a pressure of air on the other side becomes higher than that on the one side by a set pressure. Each of the circuit valves 61, 63 in the closed state prevents air from flowing out of the tank 34. The circuit valve 62 in the closed state prevents air from flowing out of the common passage 22. The circuit valve 64 in the closed state prevents supply of air to the common passage 22.

The intake valve 44 is provided between a connecting portion 65s of the third passage 65 and the atmosphere as an outside the vehicle-height control system. The intake valve 44 is a mechanical check valve which is opened and closed by a pressure differential. The intake valve 44 is closed when a pressure of air at the connecting portion 65s is equal to or higher than the atmospheric pressure and is open when the pressure of air at the connecting portion 65s is lower than the atmospheric pressure. When the pressure of air at the connecting portion 65s becomes lower than the atmospheric pressure by the operation of the compressor 40, air is sucked from the atmosphere via a filter 43 and the intake valve 44. The air discharge valve 32 is connected to a connecting portion 66s of the fourth passage 66. The air-discharge valve 32 is a normally closed electromagnetic valve. When being in an open state, the air-discharge valve 32 allows discharge of air from the fourth passage 66 to the atmosphere. When being in a closed state, the air-discharge valve 32 prevents discharge of air from the fourth passage 66 to the atmosphere. The air-discharge valve 32 however allows supply of air from the atmosphere to the fourth passage 66 when a pressure of air in the fourth passage 66 becomes lower than the atmospheric pressure by a set pressure in the closed state. A dryer 70 and a flow restricting mechanism 72 are provided in series on the fourth passage 66 at positions located on a side of the connecting portion 66s which is located nearer to the second passage 52. The flow restricting mechanism 72 includes a pressure differential valve 72v and a restrictor 72s provided in parallel. The pressure differential valve 72v prevents flow of air from a second-passage side to a compressor side. When a pressure on the compressor side becomes higher than that on the second-passage side by a set pressure, the pressure differential valve 72v allows flow of air from the compressor 40 to the second passage 52.

Figure 2:
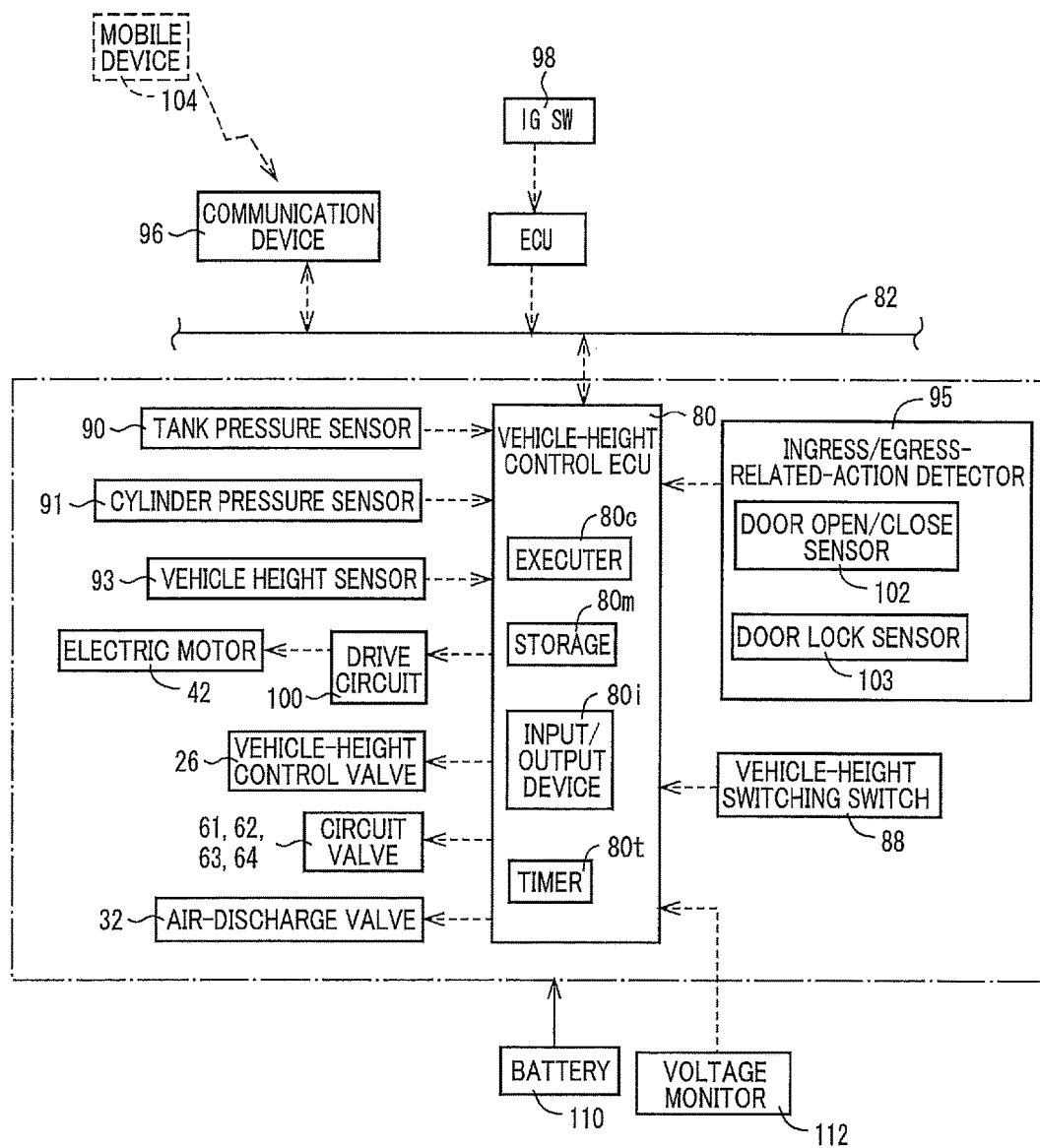
FIG. 2 is a conceptual view illustrating a vehicle-height control ECU and devices connected thereto in the vehicle-height control system.

In the present embodiment, the vehicle-height control system is controlled by a vehicle-height control electronic control unit (ECU) 80 mainly constituted by a computer. The vehicle-height control ECU 80 is communicable with devices, such as ECUs, via a controller area network (CAN) 82. As illustrated in FIG. 2, the vehicle-height control ECU 80 includes an executer 80c, a storage 80m, an input/output device 80i, and a timer 80t. Devices connected to the input/output device 80i include a vehicle-height switching switch 88, a tank pressure sensor 90, a cylinder pressure sensor 91, vehicle height sensors 93, and ingress/egress-related-action detectors 95. Also, devices including a communication device 96 and an ignition switch 98 are connected to the input/output device 80i via the CAN 82. The electric motor 42 is connected to the input/output device 80i via a drive circuit 100. The air-discharge valve 32, the vehicle-height control valves 26, and the circuit valves 61-64 are connected to the input/output device 80i.

A driver operates the vehicle-height switching switch 88 to instruct a change of the vehicle height to one of "L" (Low), "N" (Normal), and "H" (High). The tank pressure sensor 90 detects the tank pressure. The cylinder pressure sensor 91 is provided on the common passage 22. When any of the vehicle-height control valves 26 is open, the cylinder pressure sensor 91 detects a pressure of air in the air chamber 19 defined in the air cylinder 2 corresponding to the open vehicle-height control valve 26 (the wheel). When all the vehicle-height control valves 26 are closed, the cylinder pressure sensor 91 detects a pressure of the air in the common passage 22. The vehicle height sensors 93 are provided for the respective wheels 2FL, 2FR, 2RL, 2RR. Each of the vehicle height sensors 93 detects a deviation from a standard distance between the wheel-side member and the vehicle-body-side member for the corresponding wheel (noted that the standard distance corresponds to a standard vehicle height) to detect a vehicle height which is a distance between the vehicle-body-side member and the wheel-side member, i.e., a height of the vehicle-body-side member from the wheel-side member. The ingress/egress-related-action detectors 95 detect the presence or absence of operation relating to getting on and off of the vehicle. The ingress/egress-related-action detectors 95 are provided respectively for a plurality of doors provided on the vehicle. Each of the ingress/egress-related-action detectors 95 includes: a door open/close sensor (a courtesy lamp sensor) 102 that detects opening and closing of a corresponding one of the doors; and a door lock sensor 103 that detects a locking operation and an unlocking operation for the corresponding door. Getting on and off and intention of start of driving are estimated based on opening and closing of the door and the locking and unlocking operations for the door, for example. The communication device 96 communicates with a mobile device 104 owned by, e.g., the driver in a predetermined communicable area. The locking and unlocking operations for the door may be performed based on the communication of the communication device 96.

The vehicle-height control system includes a battery 110 and is operable by electric power provided from the battery 110. Power voltage as voltage of the battery 110 is detected by a voltage monitor 112 that is connected to the input/output device 80i of the vehicle-height control ECU 80.

There will be next explained vehicle height control. In the vehicle-height control system according to the present embodiment, a target vehicle height is determined for each of the front left and right and rear left and right wheels based on a running state of the vehicle. The air supply and discharge device 24 and the vehicle-height control valves 26 are controlled such that an actual vehicle height is brought closer to the target vehicle height for each wheel. The vehicle height control is also executed in the case where a predetermined condition is satisfied. Examples of this case include: a case where the vehicle-height switching switch 88 is operated; a case where it is estimated that a person is to get on or off the vehicle, and a case where an after-egress set time is elapsed. A difference between the actual vehicle height and the target vehicle height determined based on, e.g., the running state, a state of the vehicle-height switching switch 88, and an ingress/egress state is a deviation. In the case where an absolute value of this deviation is for example greater than or equal to a set value, it is determined that a vehicle-height control request is issued, that is, it is determined that an initiating condition is satisfied, and a start instruction is output. In the case where the actual vehicle height (or an actual vehicle-height change amount which is an actual amount of change of the vehicle height) has been brought close to the target vehicle height (or a target amount of change of the vehicle height), for example, in the case where the actual vehicle height (or the actual vehicle-height change amount) falls within a set range determined by the target vehicle height (or the target amount of change of the vehicle height) and the width of dead band, it is determined that a terminating condition is satisfied, and a termination instruction is output. In the present embodiment, the vehicle height control is executed from the output of the start instruction to the output of the termination instruction. Air intake control and air discharge control are executed in the same manner.

Figure 3A:
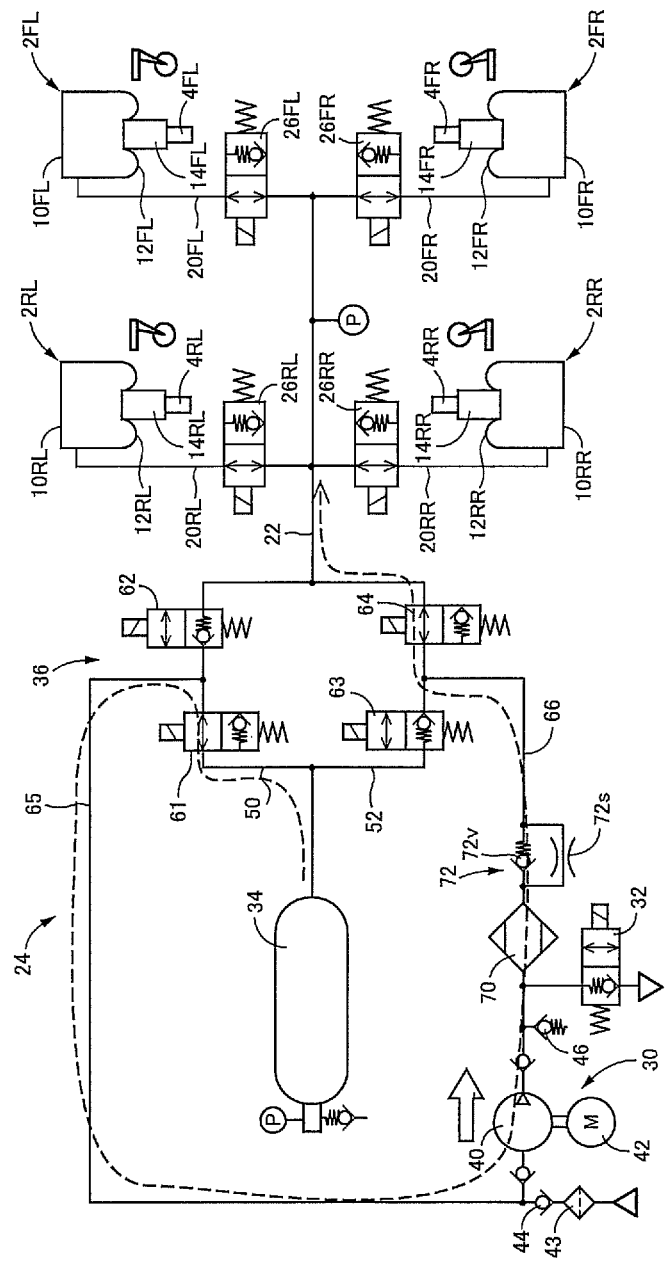
FIG. 3A is a view illustrating a state in which up control is executed in the vehicle-height control system.
Figure 3B:
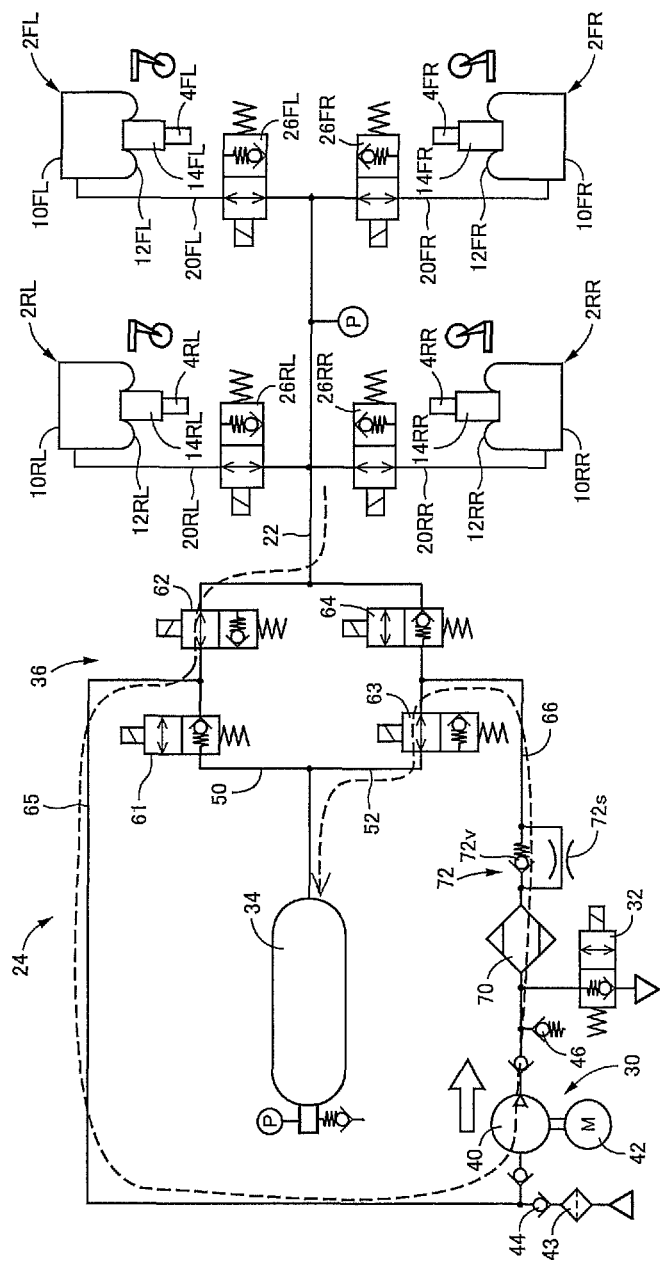
FIG. 3B is a view illustrating a state in which down control is executed.

For example, the state illustrated in FIG. 3A is established to increase the vehicle height (noted that this control may be hereinafter referred to as "up control"). In this control, the circuit valves 62, 63 are closed, and the circuit valves 61, 64 are opened. Also, the vehicle-height control valve 26 corresponding to each control target wheel is opened. In FIGS. 3A and 3B, all the four wheels are control target wheels, but the following explanation will be provided for one of the control target wheels for simplicity. Furthermore, the electric motor 42 is driven to operate the compressor 40. As a result, the tank 34 and the air cylinder 2 respectively communicate with the third passage 65 and the fourth passage 66, and air stored in the tank 34 is pressurized by the compressor 40 and supplied to the air chamber 19 defined in the air cylinder 2 provided for the control target wheel. This operation increases the vehicle height for the control target wheel. Upon completion of the up control, the state illustrated in FIG. 1 is established again. The state illustrated in FIG. 3B is established to lower the vehicle height (noted that this control may be hereinafter referred to as "down control"). The electric motor 42 is driven to operate the compressor 40. Also, the circuit valves 61, 64 are closed, the circuit valves 62, 63 are opened, and the vehicle-height control valve 26 corresponding to the control target wheel is opened. As a result, the air cylinder 2 and the tank 34 respectively communicate with the third passage 65 and the fourth passage 66. The operation of the compressor 40 causes air to be discharged from the air chamber 19 defined in the air cylinder 2 provided for the control target wheel and supplied to the tank 34, thereby lowering the vehicle height. Upon completion of the down control, the state illustrated in FIG. 1 is established again.

Figure 9:
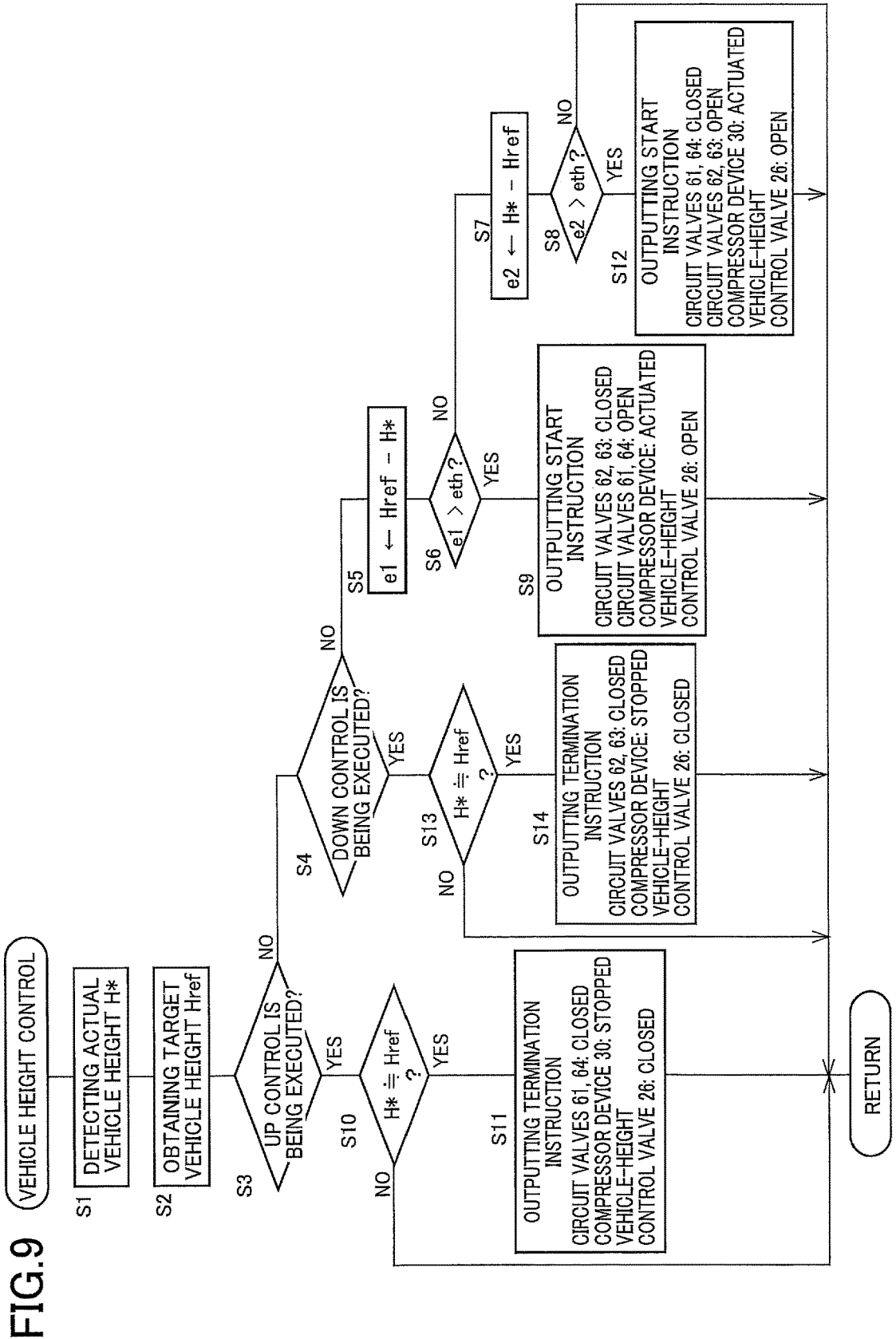
FIG. 9 is a flow chart illustrating a vehicle-height control program stored in a storage of a vehicle-height control ECU of the vehicle-height control system.

A vehicle-height control program represented by the flow chart in FIG. 9 is executed each time when a set length of time is elapsed. At S1, each of the vehicle height sensors 93 detects an actual vehicle height H* for a corresponding one of the front left and right and rear left and right wheels. At S2, a target vehicle height Href is obtained. At S3, it is determined whether the up control is being executed. At S4, it is determined whether the down control is being executed. When neither the up control nor the down control is being executed, a deviation e1 is obtained at S5 by subtracting the actual vehicle height H* from the target vehicle height Href. At S6, it is determined whether the deviation e1 is greater than a threshold value eth, that is, it is determined whether the initiating condition for the up control is satisfied. At S7, a deviation e2 is obtained by subtracting the target vehicle height Href from the actual vehicle height H*. At S8, it is determined whether the deviation e2 is greater than the threshold value eth, that is, it is determined whether the initiating condition for the down control is satisfied. When the initiating condition is not satisfied for the up control and the down control, the processings at S1-S8 are repeated. When the initiating condition for the up control is thereafter satisfied, for example, a positive decision (YES) is made at S6, and this flow goes to S9. At S9, the start instruction is output to close the circuit valves 62, 63, open the circuit valves 61, 64, actuate the compressor device 30, and open the vehicle-height control valve 26 corresponding to the control target wheel. During the up control, a positive decision (YES) is made at S3, and it is determined at S10 whether the terminating condition is satisfied. That is, it is determined whether the actual vehicle height H* is close to the target vehicle height Href. That is, it is determined that the actual vehicle height H* has reached a range determined by the target vehicle height Href and a width of dead band $\Delta H$. When the actual vehicle height H* is within the range determined by the target vehicle height Href and the width of dead band $\Delta H$, it is determined that the terminating condition is satisfied, and a positive decision (YES) is made at S10. At S11, the termination instruction is output to close the circuit valves 61, 64, stop the compressor device 30, and close the vehicle-height control valve 26. When the initiating condition for the down control is satisfied, a positive decision (YES) is made at S8. At S12, the start instruction is output to close the circuit valves 61, 64, open the circuit valves 62, 63, actuate the compressor device 30, and open the vehicle-height control valve 26 corresponding to the control target wheel. Air is discharged from the air cylinder 2, pressurized, and supplied to the tank 34. During the down control, it is determined at S13 whether the actual vehicle height H* has been brought close to the target vehicle height Href. That is, it is determined that the actual vehicle height H* is within the range determined by the target vehicle height Href and the width of dead band $\Delta H$. When a positive decision (YES) is made at S13, the terminating condition is satisfied. At S14, the termination instruction is output to close the circuit valves 62, 63, stop the compressor device 30, and close the vehicle-height control valve 26.

Figure 4A:
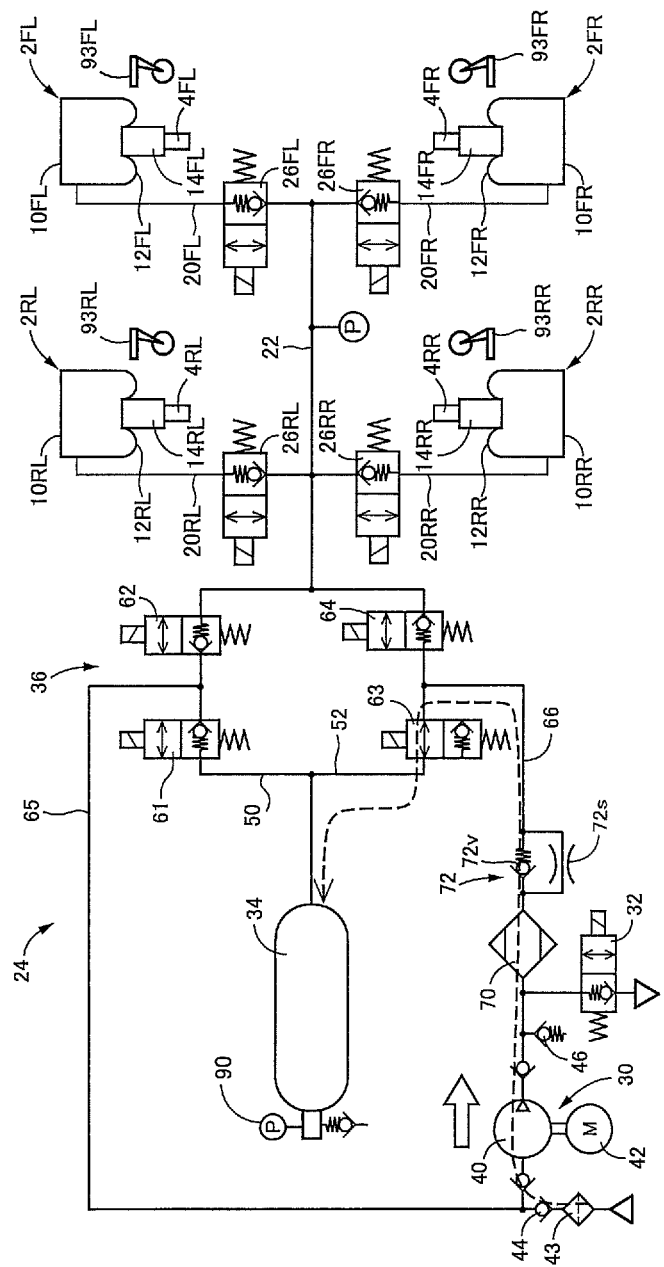
FIG. 4A is a view illustrating a state in which air intake control is executed for a tank of the vehicle-height control system.

There will be next explained tank pressure control. The tank pressure control includes the air intake control and the air discharge control. The air intake control is supply control in which air is sucked from the atmosphere and supplied to the tank 34 in the event of shortage of the tank pressure. The tank pressure control is executed plural times (e.g., n times) until a tank-pressure increase amount $\Delta PT$ as an amount of increase in tank pressure PT detected the tank pressure sensor 90 becomes higher than or equal to a target increase amount $\Delta PTref$ ($\Delta PTs \times n$, for example) after the tank pressure PT becomes lower than an air-intake start threshold value PT1. A continuous driving time of the electric motor 42 is limited by a standard of the compressor device 30, in other words, the electric motor 42. Thus, it is in some cases not preferable that the electric motor 42 is continuously operated until the tank-pressure increase amount $\Delta PT$ reaches the target increase amount $\Delta PTref$ after the tank pressure PT becomes lower than the air-intake start threshold value PT1. The compressor device 30 is stopped by switching the electric motor 42 to the OFF state at least one time until the tank-pressure increase amount $\Delta PT$ reaches the target increase amount $\Delta PTref$ after the tank pressure PT becomes lower than the air-intake start threshold value PT1. It is noted that the OFF state (hereinafter may be simply referred to as "OFF") is a state in which no power is supplied to the electric motor 42. The state illustrated in FIG. 4A is established in the air intake control. The circuit valves 61, 62, 64 are closed, the circuit valve 63 is opened, and the electric motor 42 is driven to operate the compressor 40. In this state, the third passage 65 is isolated from the air cylinder 2 and the tank 34, in other words, air is not supplied from the tank 34 and the air cylinder 2 to the third passage 65. Thus, the operation of the compressor device 30 sucks air from the third passage 65, resulting in a lower pressure of air in the third passage 65. When the pressure of air in the third passage 65 becomes lower than the atmospheric pressure, the intake valve 44 is opened. Air is sucked from the atmosphere (outside the vehicle-height control system) via the intake valve 44 and stored into the tank 34, resulting in increase in the tank pressure.

Figure 11:
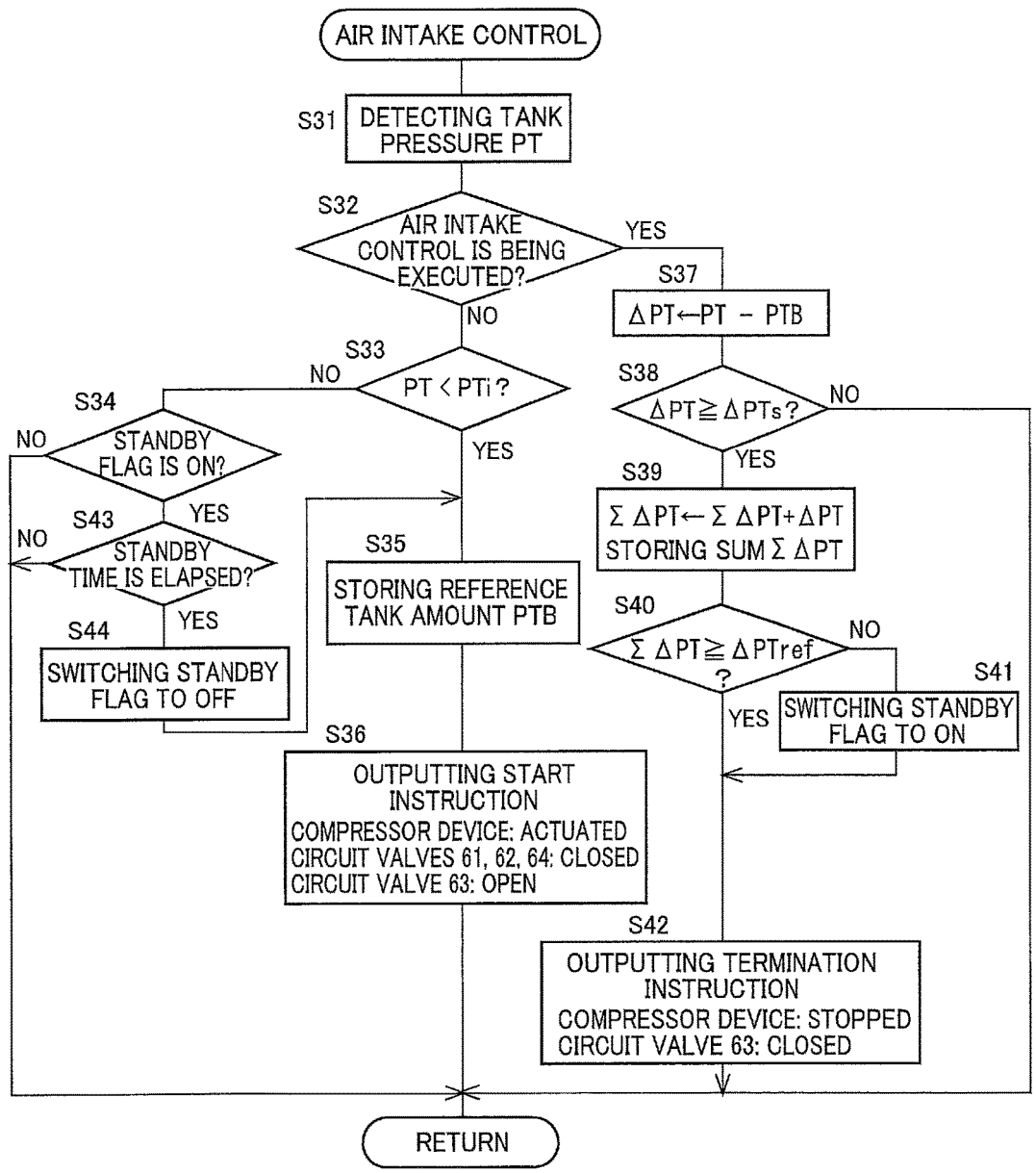
FIG. 11 is a flow chart illustrating an air-intake control program stored in the storage.

There will be next explained one example of an air-intake control program with reference to the flow chart in FIG. 11. At S31, the tank pressure PT is detected. At S32, it is determined whether the air intake control is being executed. When the air intake control is not being executed, it is determined at S33 whether the tank pressure PT is lower than the air-intake start threshold value PT1. At S34, it is determined whether a standby flag is ON. When negative decisions are made at S32, S33, and S34, the processings at S31-S34 are repeated. When the tank pressure PT becomes lower than the air-intake start threshold value PT1, it is determined that the initiating condition for the air intake control is satisfied, and a positive decision (YES) is made at S33. This flow then goes to S35 at which the tank pressure PT at this point in time is stored as a reference tank amount PTB. At S36, the start instruction is output to close the circuit valves 61, 62, 64, open the circuit valve 63, and actuate the compressor device 30. A positive decision (YES) is thereafter made at S32. Thus, at S37, the tank-pressure increase amount ΔPT is obtained by subtracting the reference tank amount PTB from the tank pressure PT detected at S31. At S38, it is determined whether the tank-pressure increase amount ΔPT has reached an individual increase amount ΔPTs as a set increase amount. One example of the individual increase amount ΔPTs is a value which is set based on, e.g., an amount of air supplied to the tank 34 by one continuous operation of the compressor device 30. Before the tank-pressure increase amount ΔPT reaches the individual increase amount ΔPTs, a negative decision (NO) is made at S38, and the processings at S31, S32, S37, and S38 are repeated. When the tank-pressure increase amount ΔPT thereafter has reached the individual increase amount ΔPTs, it is determined that the terminating condition for one air intake control. As a result, a positive decision (YES) is made at S38, and this flow goes to S39 at which the sum ΣΔPT of the tank-pressure increase amounts ΔPT in the respective air intake controls is obtained and stored. At S40, it is determined whether the stored sum ΣΔPT of the tank-pressure increase amounts ΔPT has reached the target increase amount ΔPTref. Before the stored sum ΣΔPT reaches the target increase amount ΔPTref, the standby flag is switched to ON at S41, and the termination instruction is at S42 output to close the circuit valve 63 and stop the compressor device 30.

Since the termination instruction is output, a negative decision (NO) is made at S32. However, since the tank pressure PT is higher than the air-intake start threshold value PT1, and the standby flag is ON, a negative decision (NO) is made at S33, and a positive decision (YES) is made at S34. At S43, it is determined that a time elapsed from the switch of the electric motor 42 to OFF has reached a standby time. One example of the standby time is a length of time which is required to cool the electric motor 42 to a state in which the electric motor 42 can be actuated again. When the time elapsed from the switch of the electric motor 42 to OFF has reached the standby time, it is determined that the initiating condition for the air intake control is satisfied. This flow then goes to S44 at which the standby flag is switched to OFF. The tank pressure at this point in time is at S35 stored as the reference tank amount PTB, and the start instruction is output at S36. It is noted that, as will be described below, the electric motor 42 is not limited to be switched to OFF immediately after the terminating condition is satisfied. Thus, a negative decision (NO) is made at S43 when the terminating condition is satisfied but the electric motor 42 is the ON state (ON). It is noted that the ON state (hereinafter may be simply referred to as "ON") is a state in which power is supplied to the electric motor 42. After the completion of the processing at S36, it is determined at S37 and S38 whether the tank-pressure increase amount ΔPT has reached the individual increase amount ΔPTs. When the tank-pressure increase amount ΔPT has reached the individual increase amount ΔPTs, it is determined that the terminating condition is satisfied, and the termination instruction is output at S42. Thereafter, the electric motor 42 is switched to OFF, and when the standby time is elapsed, the electric motor 42 is switched to ON. The switches of the electric motor 42 between OFF and ON are repeated until the tank-pressure increase amount ΔPT reaches the target increase amount ΔPTref.

Figure 4B:
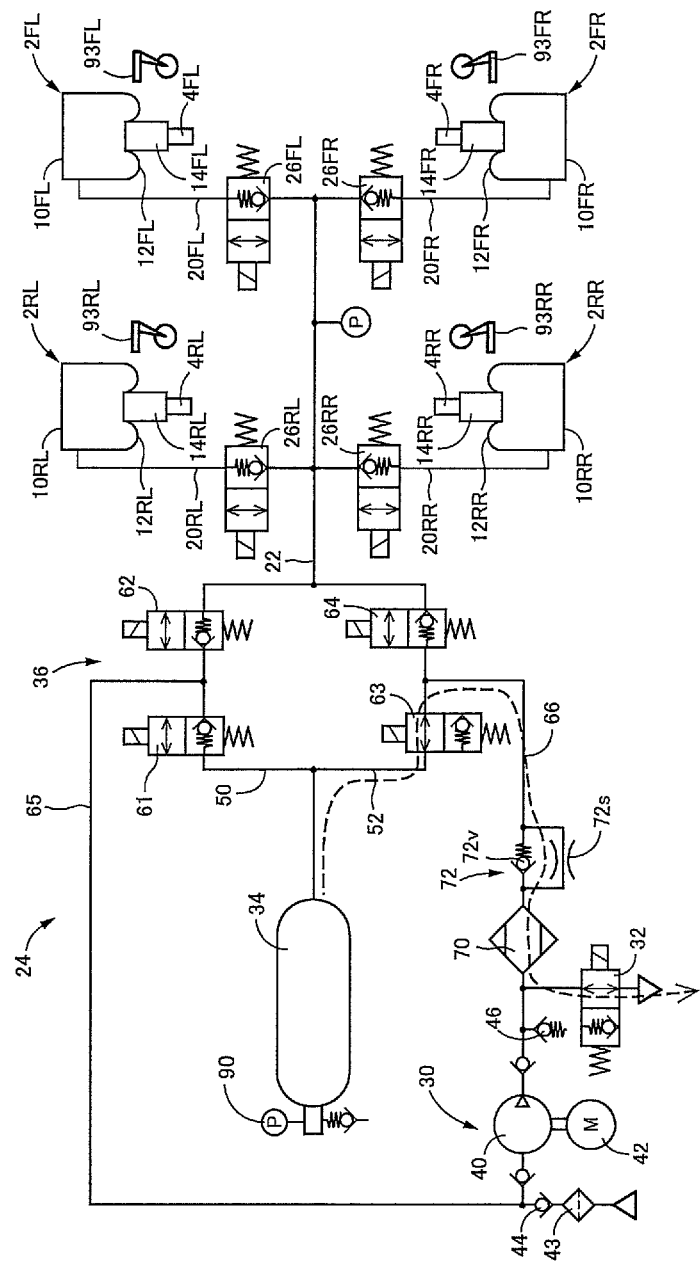
FIG. 4B is a view illustrating a state in which air discharge control is executed for the tank of the vehicle-height control system.
Figure 10:
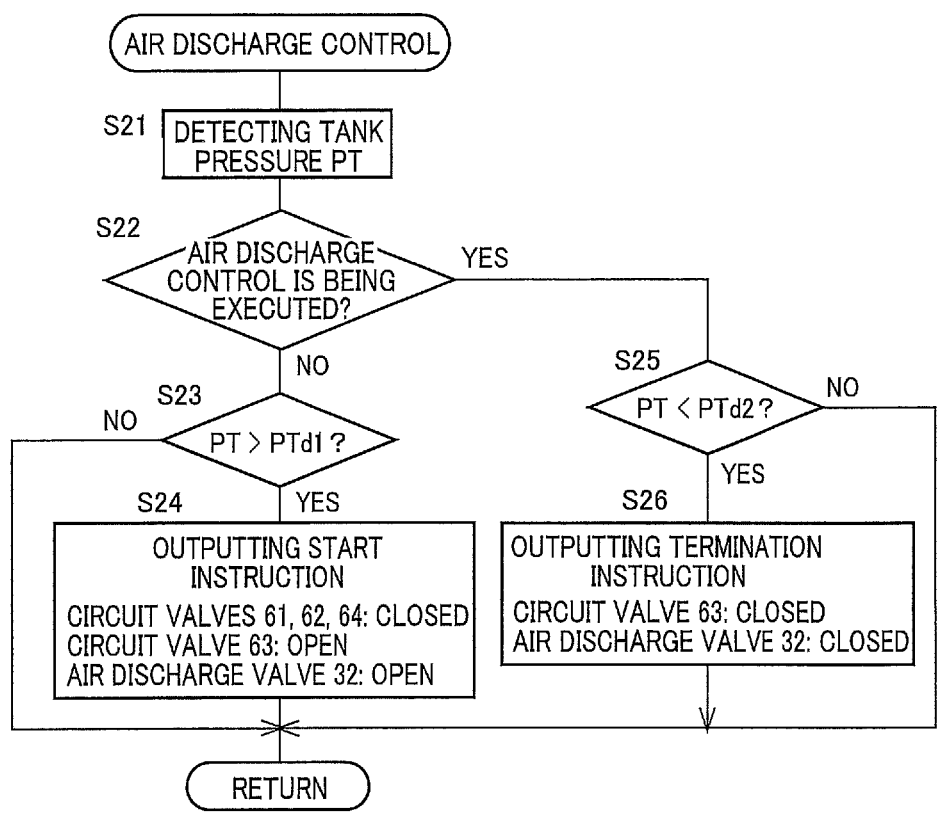
FIG. 10 is a flow chart illustrating an air-discharge control program stored in the storage.

The air discharge control is discharge control in which air is discharged from the tank when the tank pressure is too high. When the tank pressure PT becomes higher than an air-discharge start threshold value PTd1 as a discharge-start threshold value, it is determined that the initiating condition for the air discharge control is satisfied. As a result, the start instruction is output to close the circuit valves 61, 62, 64, open the circuit valve 63, and open the air discharge valve 32 as a discharge valve, so that the state illustrated in FIG. 4B is established. In this state, the tank 34 is isolated from the third passage 65 but communicates with the fourth passage 66. Air in the tank 34 is discharged to the atmosphere via the dryer 70 and the air discharge valve 32. When the tank pressure PT becomes lower than an air-discharge termination threshold value PTd2, it is determined that the terminating condition is satisfied. As a result, the termination instruction is output to close the circuit valve 63 and the air discharge valve 32, so that the state illustrated in FIG. 1 is established. The air discharge control is executed by execution of an air-discharge control program represented by the flow chart in FIG. 10. At S21, the tank pressure PT is detected by the tank pressure sensor 90. At S22, it is determined whether the air discharge control is being executed. When the air discharge control is not being executed, it is determined at S23 whether the tank pressure PT is higher than the air-discharge start threshold value PTd1. When the tank pressure PT is higher than the air-discharge start threshold value PTd1, it is determined that the initiating condition is satisfied, the start instruction is output at S24. When the air discharge control is being executed, it is determined at S25 whether the tank pressure PT is lower than the air-discharge termination threshold value PTd2. When the tank pressure PT is lower than the air-discharge termination threshold value PTd2, it is determined that the terminating condition is satisfied, and the termination instruction is output at S26.

There will be next explained air supply control. The air supply control is control in which air is supplied to a low pressure portion of the air supply and discharge device 24. The air supply control includes pressure-difference reduction control and tank communication control. The pressure-difference reduction control is control for reducing a difference in pressure of air between the third passage 65 connected to the intake-side portion 40a of the compressor 40 and the fourth passage 66 connected to the discharge-side portion 40b. In the pressure-difference reduction control, control for opening and closing the circuit valves 61-64 forms a closed circuit including the compressor 40, the third passage 65, and the fourth passage 66. Large sounds and vibrations are caused when the compressor 40 is actuated or stopped in a state in which a difference in pressure of air between the intake-side portion 40a and the discharge-side portion 40b of the compressor 40 is large. It is known that the difference in pressure of air between the intake-side portion 40a and the discharge-side portion 40b decreases with decrease in the difference in pressure of air between the third passage 65 and the fourth passage 66. Thus, in the present embodiment, the closed circuit including the compressor 40, the third passage 65, and the fourth passage 66 is formed to reduce the difference in pressure of air between the third passage 65 and the fourth passage 66 and thereby reduce the difference in pressure of air between the intake-side portion 40a and the discharge-side portion 40b, and the electric motor 42 is thereafter switched between ON and OFF.

The pressure-difference reduction control is executed at start and termination of the vehicle height control and the air intake control, i.e., the vehicle height control and the tank pressure control in which the compressor device 30 is operated. When the pressure-difference reduction control is executed at the start, the compressor device 30 is in a non-operating state in the case where the closed circuit is formed. When the pressure-difference reduction control is executed at the termination, the compressor 40 is in an operating state at the point in time when the closed circuit is formed. In the case where the closed circuit is formed in the operating state of the compressor 40, air is circulated in the closed circuit by the compressor 40. Thus, the pressure-difference reduction control executed at the termination may be referred to as "circulation control".

Figure 15A:
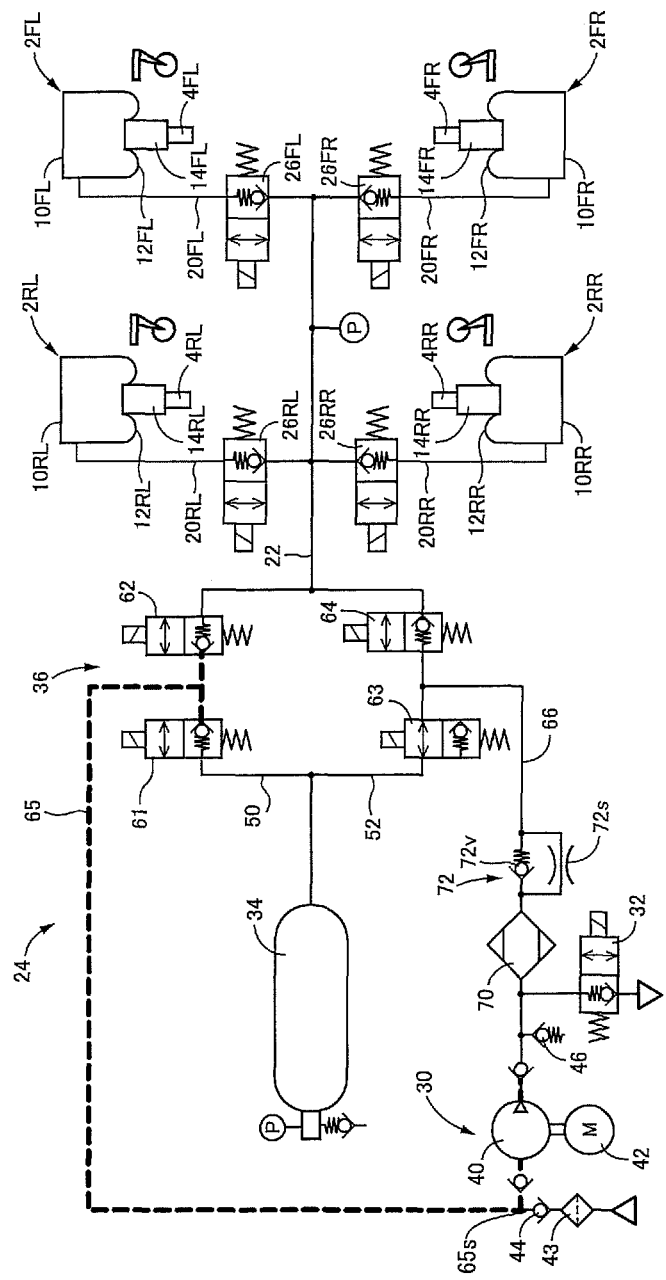
FIG. 15A is a view illustrating a low pressure portion at termination of the vehicle height control and the air intake control.

At termination of the vehicle height control or the air intake control, that is, when the termination instruction containing a stop instruction for stopping the compressor device 30 is output, as illustrated in FIG. 15A, it is usual that the pressure of air in the third passage 65 indicated by the broken line is lower than the pressure of air in the fourth passage 66, and the pressure of the air is lower at the intake-side portion 40a of the compressor 40 than at the discharge-side portion 40b thereof. At start of the vehicle height control or the air intake control, a pressure difference in the air supply and discharge device 24 is small in some cases, and the necessity of execution of the pressure-difference reduction control is low in these cases. However, there may be cases including: a case (a) where the pressure difference is kept large without execution of, e.g., the air supply control at termination of the preceding vehicle height control or the preceding tank pressure control; and a case (b) where the pressure difference is reduced by, e.g., the air supply control executed at termination of the preceding vehicle height control or the preceding tank pressure control, but thereafter a large pressure difference is caused due to a change of temperature, for example. Examples of the case (b) include: a case (b-1) where a pressure difference is caused by an occurrence of variations in temperature of air due to, e.g., differences in thermal characteristics among a plurality of components constituting the air supply and discharge device 24 (e.g., the dryer 70, the circuit valves 60-64, the compressor 40, the tank 34, and the passages 48, 50, 52, 65, 66) in the case where the temperature of the entire air supply and discharge device 24 has changed; and a case (b-2) where variations in temperature occur in the vehicle-height control system, and thereby variations in temperature of air occur in the air supply and discharge device 24, leading to occurrence of a pressure difference. Also, in the air supply and discharge device 24, the third passage 65 and the fourth passage 66 are connected via the compressor 40, the intake valve 40in, and the discharge valve 40out. Thus, in the case where the pressure of air in the third passage 65 is higher than the pressure of air in the fourth passage 66, air is supplied from the third passage 65 to the fourth passage 66, but no air is supplied from the fourth passage 66 to the third passage 65 even in the case where the pressure of air in the fourth passage 66 is higher than the pressure of air in the third passage 65. Accordingly, when a pressure difference occurs in the air supply and discharge device 24 as in the cases (a) and (b), the pressure of air in the third passage 65 is lower than the pressure of air in the fourth passage 66 in many cases. In view of the above, the pressure of air in the third passage 65 may be lower than the pressure of air in the fourth passage 66 at start of the vehicle height control or the tank pressure control, and accordingly it is possible to consider that at least one of the third passage 65 and the intake-side portion 40a in the pressure-difference reduction control corresponds to the low pressure portion.

The tank communication control is executed at termination of at least one of the vehicle height control and the tank pressure control. In this tank communication control, communication between the tank 34 and the low pressure portion is established in the non-operating state of the compressor device 30. In this sense, the tank communication control may be referred to as "static tank communication control" and "non-operation tank communication control". In the tank communication control, air is supplied from the tank 34 to the low pressure portion, thereby increasing the pressure of air in the low pressure portion or eliminating the low pressure portion. With this configuration, in the case where the up control is to be executed next, for example, it is possible to reduce a control delay due to the low pressure portion. In the present embodiment, the communication between the tank 34 and the third passage 65 is established, but the tank pressure supplied to the third passage 65 is also supplied to the fourth passage 66 because the third passage 65 and the fourth passage 66 are connected to each other via the intake valve 40in and the discharge valve 40out. In the case where the pressure of air in the third passage 65 is substantially equal to the tank pressure at the point in time at which the communication between the third passage 65 and the tank 34 is established, no air is supplied from the tank 34 to the third passage 65. However, since no pressure sensor for detecting the pressure of air is provided on the third passage 65, the pressure of air in the third passage 65 is not recognized. Since the communication between the third passage 65 and the tank 34 is established, in contrast, it is possible to estimate that the pressure of air in the third passage 65 is substantially equal to the tank pressure, regardless of whether air is actually supplied from the tank 34 to the third passage 65. In view of the above, in the present embodiment, the third passage 65, or the third passage 65 and the fourth passage 66 correspond to the low pressure portion in a tank communication controller, for example.

Figure 12:
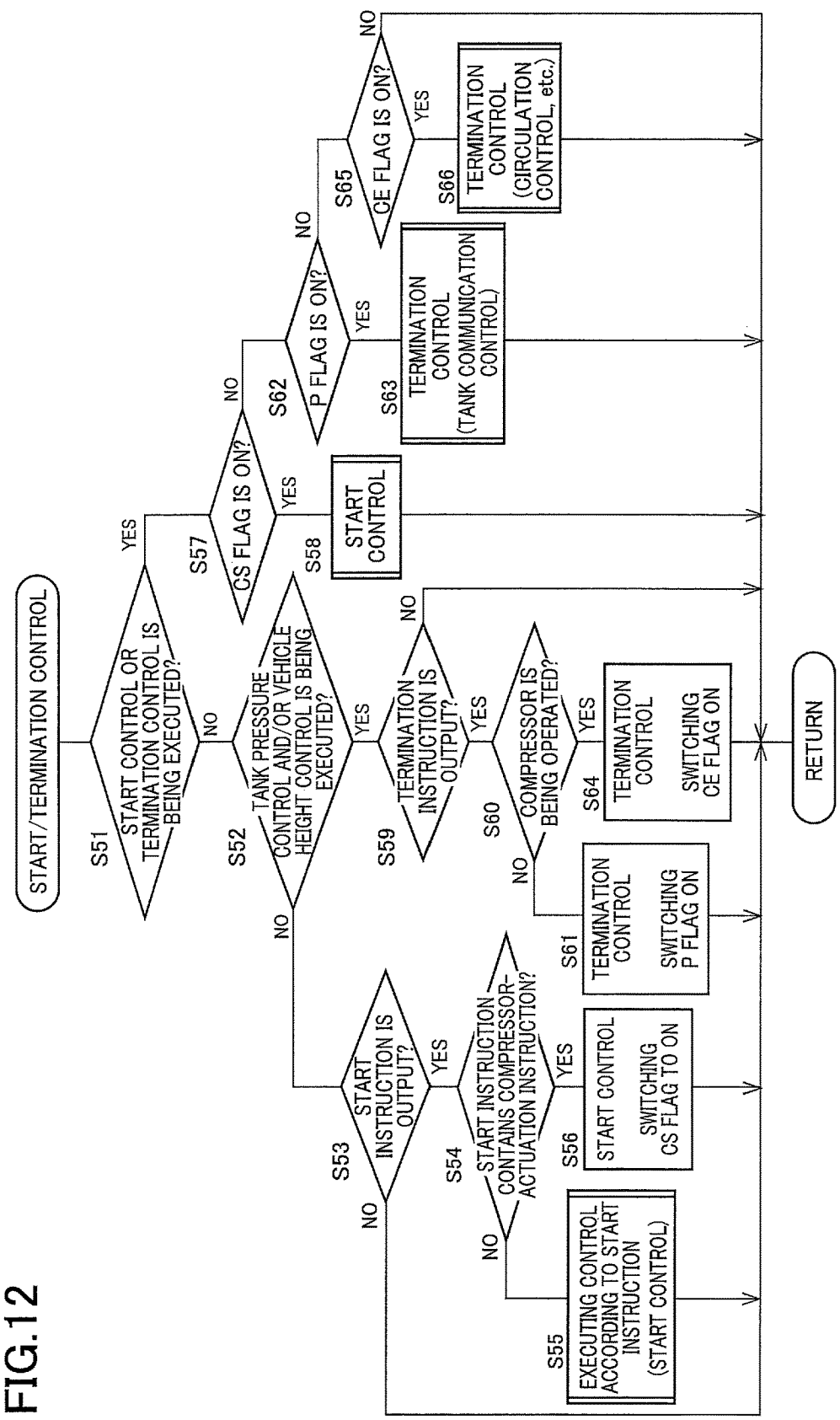
FIG. 12 is a flow chart illustrating a start/termination control program stored in the storage.

At start and termination of the vehicle height control and the tank pressure control, start control (which may also be referred to as "start processing") and termination control (which may also be referred to as "termination processing") including opening and closing of the circuit valves 61-64 and actuation and stop of the compressor device 30 are usually executed according to the start instruction and the termination instruction. In the present embodiment, the air supply control is executed in the start control and the termination control. A start/termination control program represented by the flow chart in FIG. 12 is executed each time when a set length of time is elapsed. At S51, it is determined whether the start control or the termination control is being executed. At S52, at least one of the tank pressure control and the vehicle height control is being executed. When any of a CS flag, a CE flag, and a P flag is ON, as will be described below, it is determined that the start control or the termination control is being executed. When negative decisions (NO) are made at S51 and S52, it is determined at S53 whether the start instruction is output. While the start instruction is not output, the processings at S51-S53 are repeated. When the start instruction is output, it is determined at S54 whether the start instruction contains an instruction for actuating the compressor device 30 (i.e., an actuation instruction for actuating the compressor device 30, in other words, an ON instruction for switching the electric motor 42 to ON). When the start instruction does not contain the actuation instruction for actuating the compressor device 30, the start control is executed at S55. In other words, in the case where the compressor device 30 is not operated in the vehicle height control and the tank pressure control (in the air discharge control in the present embodiment), the pressure-difference reduction control need not be executed at start. Thus, the start control (in which the circuit valve 63 is opened, and the air discharge valve 32 is opened) is executed according to the start instruction. In the case where the start instruction contains the actuation instruction for actuating the compressor device 30, the CS flag, which represents that the start control is being executed, is switched to ON at S56. Since the CS flag is ON, it is determined that the start control is being executed. Thus, positive decisions (YES) are made at S51 and S57, and the start control, which will be described below, is executed at S58.

When at least one of the tank pressure control and the vehicle height control is being executed, a positive decision (YES) is made at S52, and it is determined at S59 whether the termination instruction is output. When at least one of the tank pressure control and the vehicle height control is being executed, but the termination instruction is not output, the processings at S51, S52, and S59 are repeated. When the termination instruction is output in the at least one of the tank pressure control and the vehicle height control, it is determined at S60 whether the compressor device 30 is in the operating state. When the termination instruction is output in the air discharge control, a negative decision (NO) is made because the compressor device 30 is in the non-operating state, and this flow goes to S61. At S61, the P flag, which represents that the tank communication control of the termination control is being executed, is switched to ON. Since the P flag is ON, a positive decision (YES) is made at S51, a negative decision (NO) is made at S57, a positive decision (YES) is made at S62, and the tank communication control, which will be described below, is executed at S63.

In the case where the compressor device 30 is in the operating state when the termination instruction is output, a positive decision (YES) is made at S60, and this flow goes to S64. At S64, the CE flag, which represents that the circulation control of the termination control is being executed, is switched to ON. Thereafter, a positive decision (YES) is made at S51, negative decisions (NO) are made at S57 and S62, a positive decision (YES) is made at S65, and the circulation control is executed at S66 as will be described below.

Figure 5A:
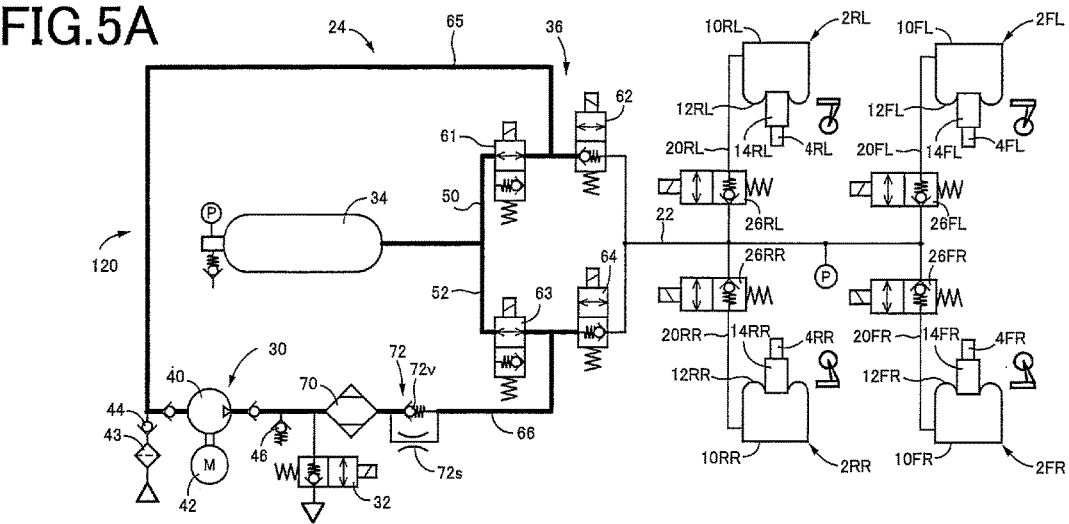
FIG. 5A is a view illustrating a state in which pressure-difference reduction control of start control is executed in the vehicle-height control system.
Figure 5B:
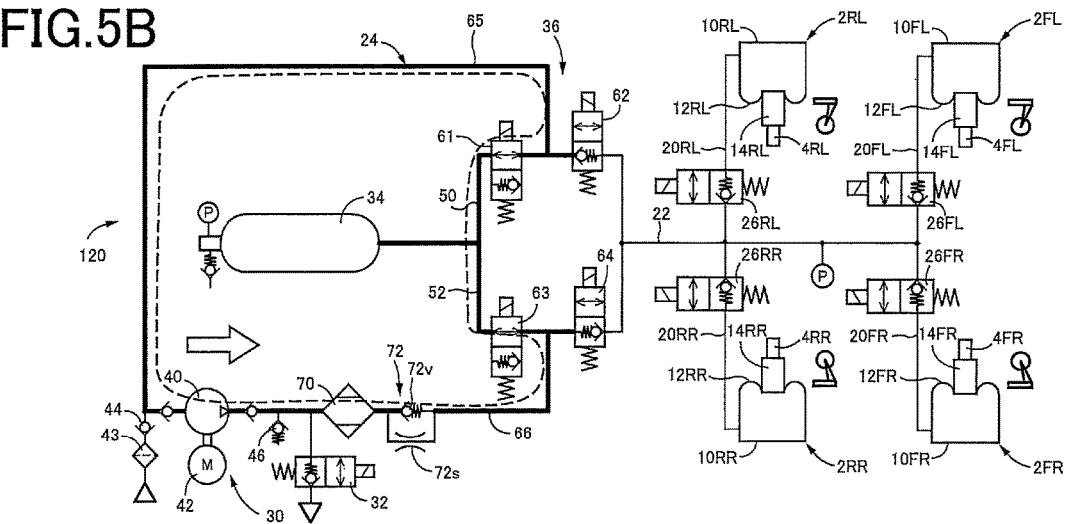
FIG. 5B is a view illustrating a state in which stabilization waiting control of the start control is executed in the vehicle-height control system.

There will be next explained the start control for the vehicle height control with reference to FIGS. 5A-5C and 7. When the start instruction for the vehicle height control (which contains the actuation instruction for actuating the compressor device 30) is output, the pressure-difference reduction control is executed. As illustrated in FIG. 5A, the circuit valves 61, 63 are open, and the circuit valves 62, 64 are closed, so that a closed circuit 120 is formed, and this state is kept for a first set length of time T1 (see the period (A) in FIG. 7). The first set length of time T1 may be a length of time which can reduce the difference in pressure of air between the third passage 65 and the fourth passage 66 and which can suppress sounds and vibrations during operation of the compressor 40. Thus, the first set length of time T1 may be referred to as "pressure-difference reduction time". Also, since the closed circuit 120 includes the high-pressure coupling passage 68t (including the connecting portion 48s of the tank passage 48), the closed circuit 120 may be referred to as "high-pressure closed circuit 120". Since the closed circuit 120 includes the tank connecting portion 48s, it is possible to reduce the pressure difference between the third passage 65 and the fourth passage 66 for a shorter time and thereby reduce the first set length of time T1 when compared with a configuration in which the closed circuit 120 does not include the tank connecting portion 48s. Air flowing in the closed circuit 120 generates flowing sounds in some cases. However, the shorter first set length of time T1 can reduce a length of time in which the flowing sounds are generated. Also, since the tank 34 communicates with the closed circuit 120, the pressure of air in each of the third passage 65 and the fourth passage 66 can be made substantially equal to the tank pressure.

After the pressure-difference reduction control, the electric motor 42 is switched to ON. The closed circuit 120 is kept for a second set length of time T2 also from the switch of the electric motor 42 to ON (see FIG. 5B and the period (B) in FIG. 7). When the electric motor 42 is switched to ON, the operation of the compressor 40 is not stable, during which the closed circuit 120 is kept. This configuration further suppresses sounds and vibrations caused due to the instability of the operation of the compressor 40 when compared with the case where the closed circuit 120 is not kept. That is, the electric motor 42 is switched to ON to actuate the compressor 40 in a state in which the difference in pressure of air between the intake-side portion 40a and the discharge-side portion 40b is small, thereby well suppressing the sounds and vibrations caused at the actuation of the compressor 40. Also, since the closed circuit 120 is kept also after the electric motor 42 is switched to ON, it is possible to well suppress vibrations caused by the instability of the operation after the actuation of the compressor 40. This control may be referred to as "stabilization waiting control", and the second set length of time may be referred to as "stabilization time".

Figure 5C:
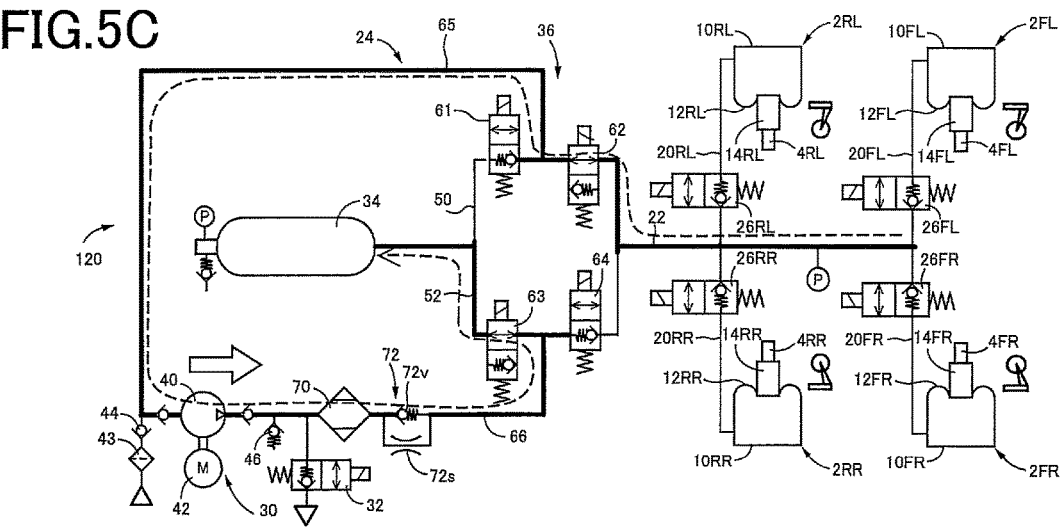
FIG. 5C is a view illustrating a state in which preparation control of the start control is executed in the vehicle-height control system.

Preparation control for the vehicle height control is executed after the stabilization waiting control. The preparation control is executed before the vehicle-height control valve 26 corresponding to the control target wheel is switched from the closed state to the open state. The preparation control is for appropriate change of the vehicle height. If the pressure of air in the common passage 22 is higher than the pressure of air in the air chamber 19 at start of the down control, the vehicle height in some cases rises by air supplied from the common passage 22 to the air chamber 19. To avoid this situation, in the present embodiment, the state illustrated in FIG. 5C is established by closing the circuit valves 61, 64 and opening the circuit valves 62, 63, and this state is kept for a third set length of time T3 (see the period (C) in FIG. 7) before the vehicle-height control valve 26 is switched from the closed state to the open state. In this state, air in the common passage 22 is sucked, pressurized, and supplied to the tank 34 by the operation of the compressor device 30, thereby lowering the pressure of air in the common passage 22. The lower pressure of air in the common passage 22 makes it difficult for air to be supplied from the common passage 22 to the air chamber 19 at start of the down control. When the pressure of air in the common passage 22 is lower than the pressure of air in the air chamber 19 at start of the up control, air is in some cases discharged from the air chamber 19 to the common passage 22, thereby lowering the vehicle height. In the present embodiment, in contrast, the circuit valves 62, 63 are closed, the circuit valves 61, 64 are opened, and this state is kept for the third set length of time T3 before the vehicle-height control valve 26 corresponding to the control target wheel is switched from the closed state to the open state. As a result, air in the tank 34 is pressurized and supplied to the common passage 22 to increase the pressure of air in the common passage 22, making it difficult for the vehicle height to be lowered at start of the up control. In view of the above, the third set length of time T3 may be a time which enables control of the pressure of air in, e.g., the common passage 22 to an appropriate height for appropriate supply and discharge of air between the air chamber 19 and the common passage 22, for example. The third set length of time T3 may be referred to as "vehicle-height-control preparation time".

Figure 13:
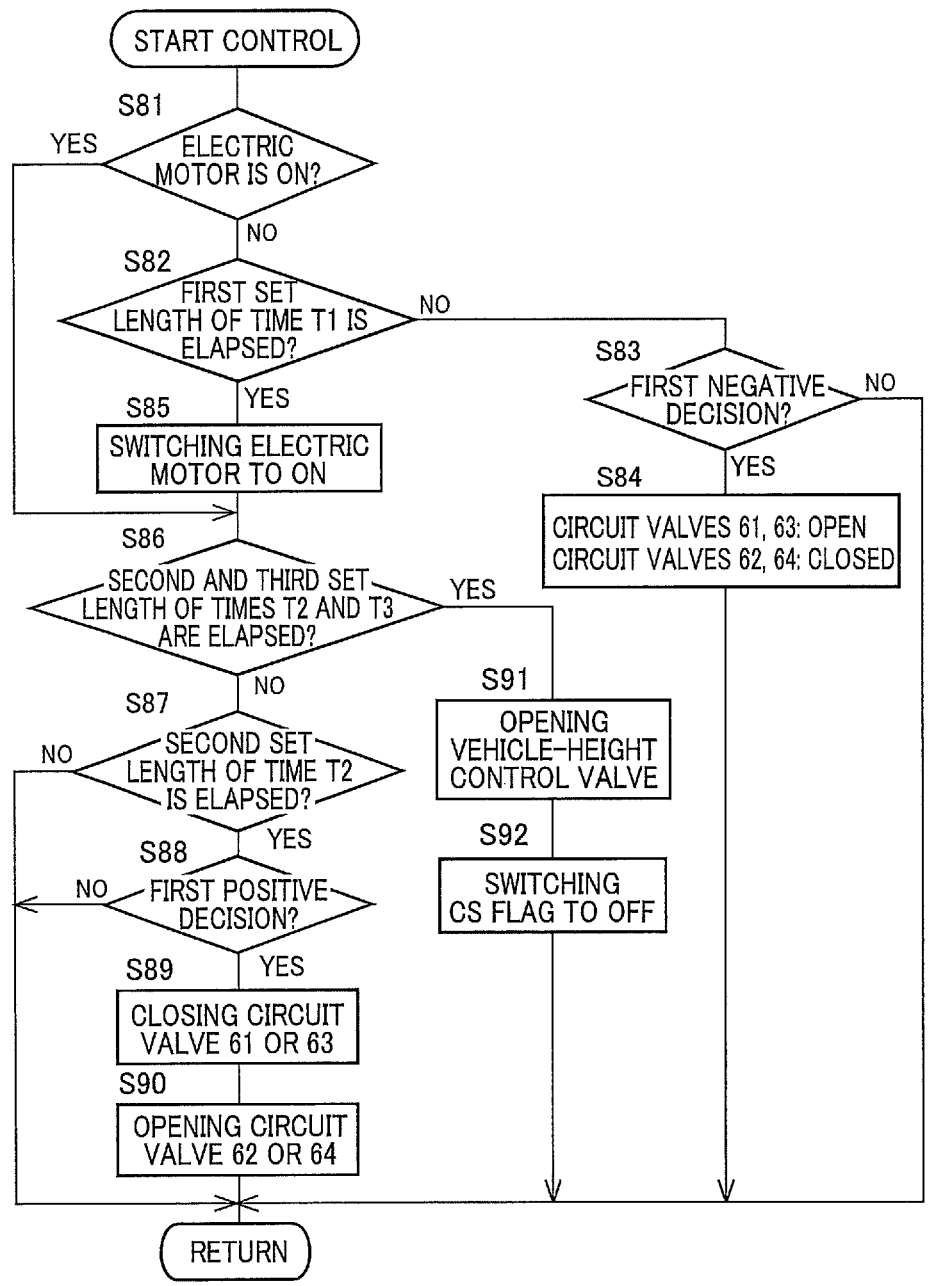
FIG. 13 is a flow chart illustrating a portion of the start/termination control program (S58)

The flow chart in FIG. 13 represents a start control routine at S58 in the case where the vehicle height control is executed. At S81, it is determined whether the electric motor 42 is ON. When the electric motor 42 is OFF, it is determined at S82 whether the first set length of time T1 is elapsed from the point in time when the CS flag is switched to ON. Before the first set length of time T1 is elapsed, it is determined at S83 whether the current negative decision (NO) made at S82 is the first negative decision at S82. When the current negative decision made at S82 is the first negative decision at S82, the closed circuit 120 is formed at S84 as described above. The processings at S51, S57, and S81-S83 are repeated while the first set length of time T1 is elapsed after the closed circuit 120 is formed. When the first set length of time T1 is elapsed, a positive decision (YES) is made at S82, and the electric motor 42 is switched to ON at S85.

At S86, it is determined whether a length of time (T2+T3), which is the sum of the second set length of time T2 and the third set length of time T3, is elapsed from the point in time when the electric motor 42 is switched to ON. At S87, it is determined whether the second set length of time T2 is elapsed. Before the second set length of time T2 is elapsed, the processings at S51, S57, S81, S86, and S87 are repeated to keep the operation of the compressor device 30 in the closed circuit 120. When the second set length of time T2 is elapsed, it is determined at S88 whether the current positive decision (YES) made at S87 is the first positive decision at S87. When the current positive decision made at S87 is the first positive decision at S87, one of the circuit valves 61, 63 is closed at S89, and one of the circuit valves 62, 64 is opened at S90 in accordance with the vehicle height control (the up control and the down control). It is thereafter determined whether the sum (T2+T3) of the second set length of time T2 and the third set length of time T3 is elapsed, in other words, it is determined whether the third set length of time T3 is elapsed after the state illustrated in FIG. 5C is established in the case where the down control is to be executed. When the third set length of time T3 is elapsed, the vehicle-height control valve 26 corresponding to the control target wheel is opened at S91. At S92, the CS flag is switched to OFF.

Figure 6A:
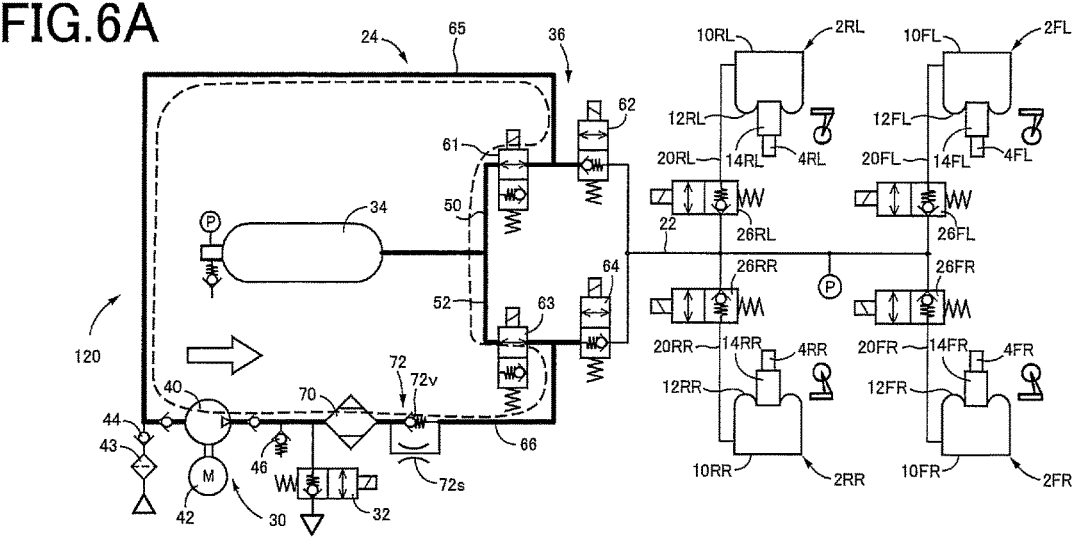
FIG. 6A is a view illustrating a state in which circulation control of termination control is executed in the vehicle-height control system.
Figure 6B:
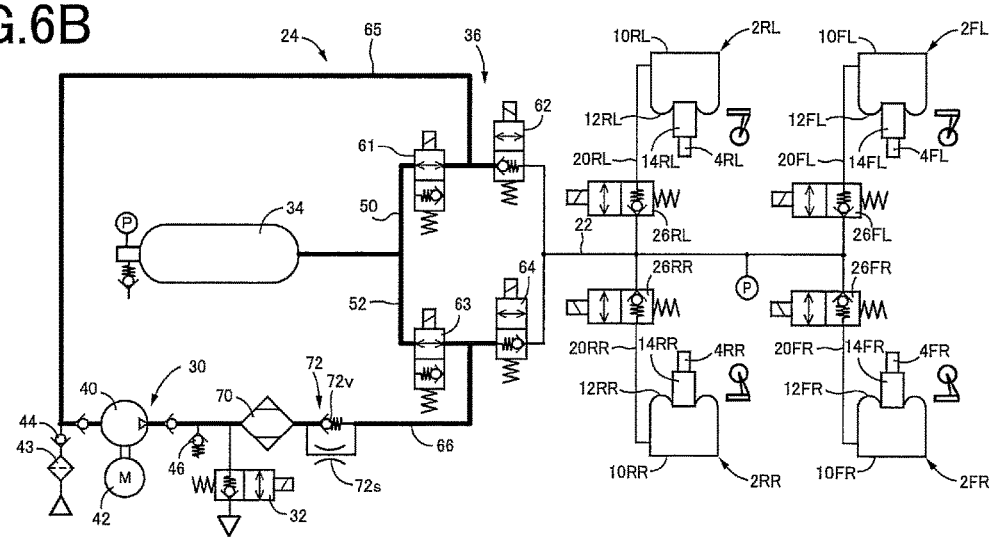
FIG. 6B is a view illustrating a state in which stop waiting control of the termination control is executed in the vehicle-height control system.

There will be next explained the termination control for the vehicle height control with reference to FIGS. 6A-6C and FIG. 7. When the termination instruction is output, the vehicle-height control valve 26 is closed. Also, before the electric motor 42 is switched to OFF, as illustrated in FIG. 6A, the closed circuit 120 is formed, and this state is kept for a fourth set length of time T4 (the period (D) in FIG. 7), that is, the circulation control is executed. In this control, air is circulated by the operation of the compressor 40 in the closed circuit 120. The fourth set length of time T4 may be a time which enables reduction of the pressure difference between the third passage 65 and the fourth passage 66. In this sense, the fourth set length of time T4 may also be referred to as "pressure-difference reduction time".

The electric motor 42 is switched to OFF after the circulation control. The closed circuit 120 is kept for a fifth set length of time T5 from the switch of the electric motor 42 to OFF (see FIG. 6B and the period (E) in FIG. 7). The compressor 40 is operated by inertia when the electric motor 42 is switched to OFF after the pressure difference between the intake-side portion 40a and the discharge-side portion 40b is reduced in the circulation control. The closed circuit 120 is kept until a speed of the operation of the compressor 40 by the inertia becomes small, i.e., during the fifth set length of time. This operation further suppresses sounds and vibrations caused at stop of the compressor 40. The vehicle-height control system may be configured such that, after the completion of the circulation control, the electric motor 42 is switched to OFF, the circuit valve 63 is closed without keeping the closed circuit 120, and the tank communication control is started. In this case, the pressure of air at the discharge-side portion 40b is higher than the pressure of air at the intake-side portion 40a. Thus, the pressure of air at the discharge-side portion 40b acts as a resistance to the compressor 40, so that the compressor 40 is stopped. Even in this case, when compared with the case where the electric motor 42 is switched to OFF without execution of the circulation control, it is possible to suppress sounds and vibrations caused at stop of the compressor 40. In the case where the closed circuit 120 is kept, however, it is possible to reduce a resistance to the compressor 40, smoothly stop the compressor 40, and further suppress the sounds and vibrations. Also, it is possible to reduce occurrences of a pressure difference due to pressurization and discharge of air which are caused by the operation of the compressor 40 by the inertia. This control will be referred to as "stop waiting control".

Figure 6C:
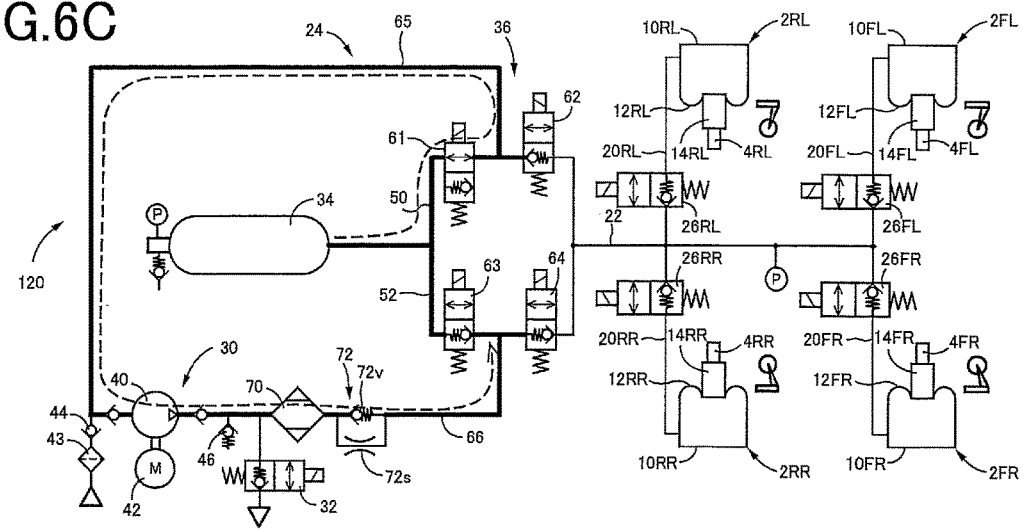
FIG. 6C is a view illustrating a state in which tank communication control of the termination control is executed in the vehicle-height control system.
Figure 7:
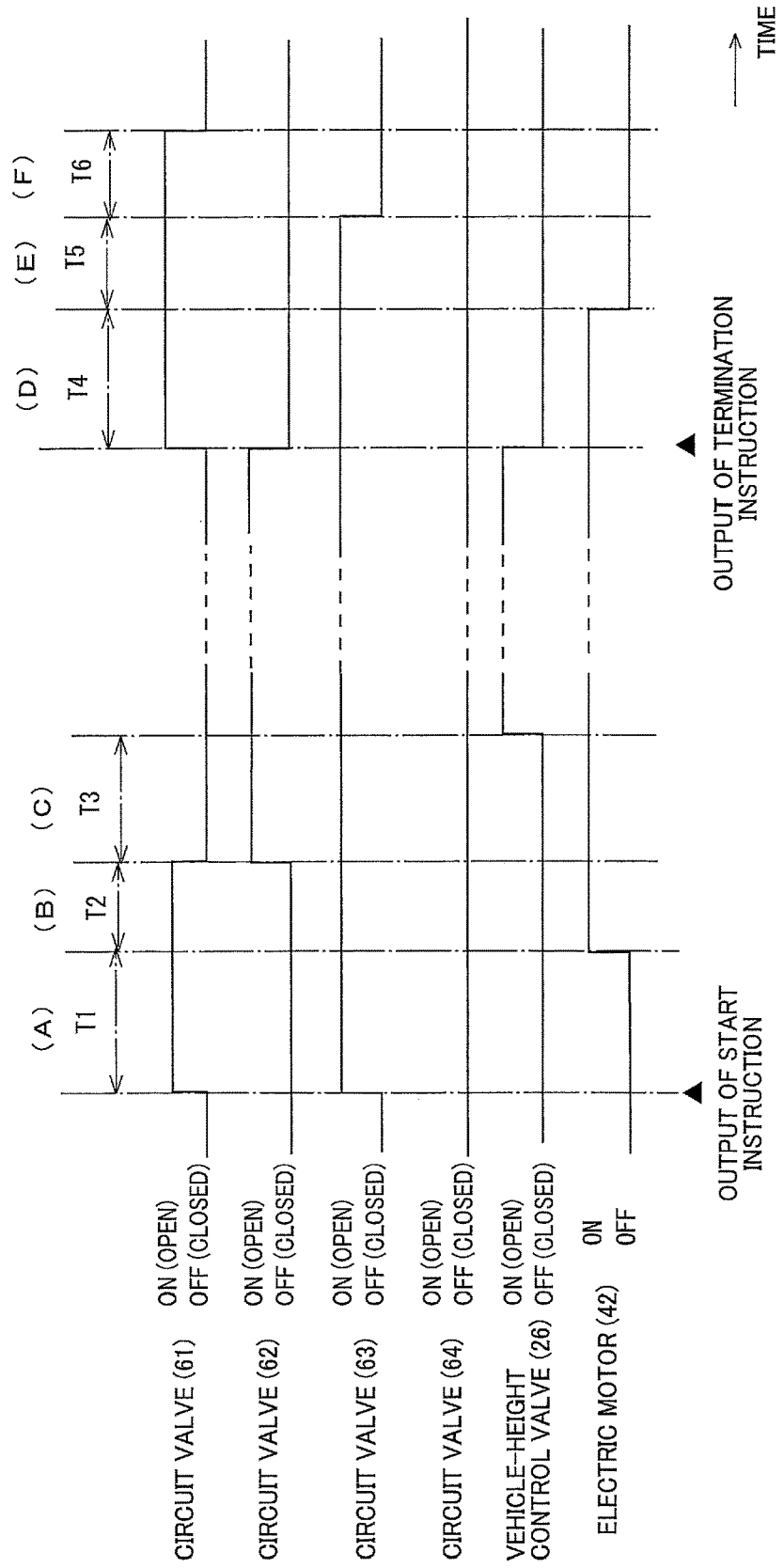
FIG. 7 is a time chart in the case where start control and termination control are executed in vehicle height control.

After this stop waiting control, as illustrated in FIG. 6C, the circuit valve 63 is closed, and the tank 34 is isolated from the fourth passage 66 and communicated with the third passage 65, that is, the tank communication control is executed. In this control, air in the tank 34 is supplied to the third passage 65 and supplied to the fourth passage 66 via the intake valve 40in and the discharge valve 40out. That is, the air in the tank 34 is supplied to the third passage 65 and the fourth passage 66. This tank communication state is kept for a sixth set length of time T6 (see the period (F) in FIG. 7). The sixth set length of time T6 may be a time required for the pressure of air in each of the third passage 65 and the fourth passage 66 to become substantially equal to the tank pressure. Thus, the tank 34 is isolated from the fourth passage 66. Accordingly, the tank pressure supplied to the third passage 65 can be supplied to the fourth passage 66 via the intake valve 40in and the discharge valve 40out in the tank communication control, resulting in uniform supply of the tank pressure to the third passage 65, the compressor 40, and the fourth passage 66. When the sixth set length of time T6 is elapsed, the circuit valve 61 is closed, and the state illustrated in FIG. 1 is established again. That is, the pressure of air in the air supply and discharge device 24 is made substantially equal to the tank pressure. Thus, in the case where the up control is to be executed next, for example, it is possible to reduce a control delay due to the low pressure portion. Also, the tank communication control is executed after the circulation control and the stop waiting control are executed in the high-pressure closed circuit 120. This control shortens the sixth set length of time T6 when compared with the case where the tank communication control is executed after the circulation control and the stabilization waiting control are executed in a closed circuit not including the tank connecting portion 48s. Thus, the third passage 65, or the third passage 65, the fourth passage 66, and other components are one example of the low pressure portion in the tank communication control. Also, each of the circuit valves 61, 63 may be referred to as "communication cut-off valve".

Figure 14A:
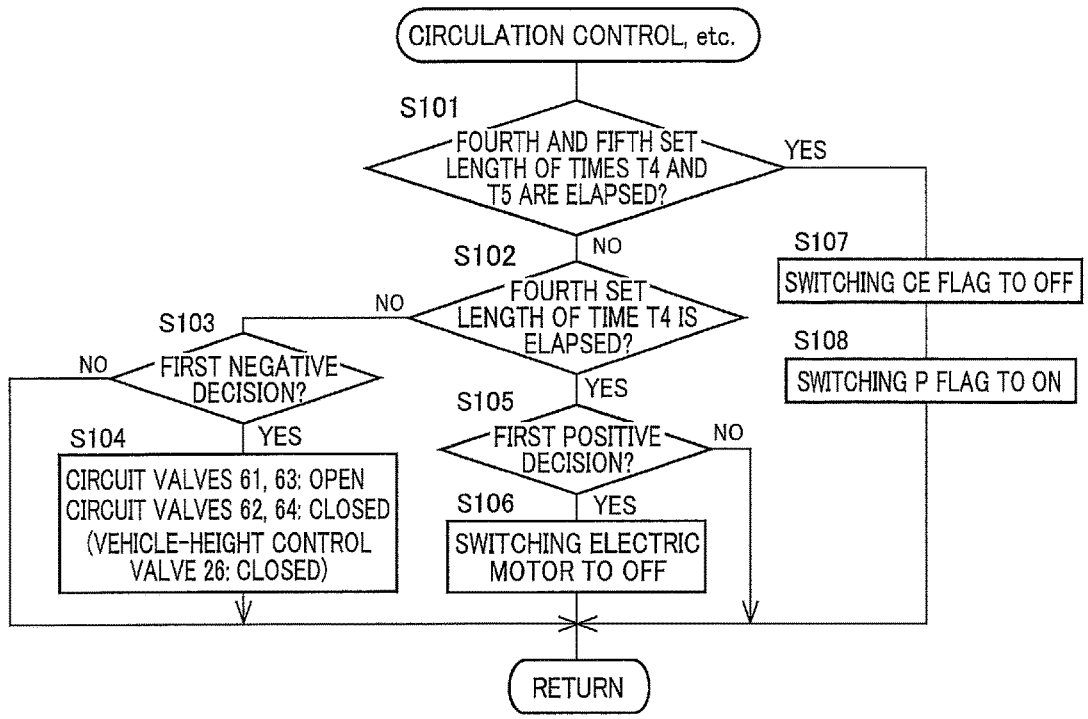
FIG. 14A is a flow chart illustrating another portion of the start/termination control program (S66)
Figure 14B:
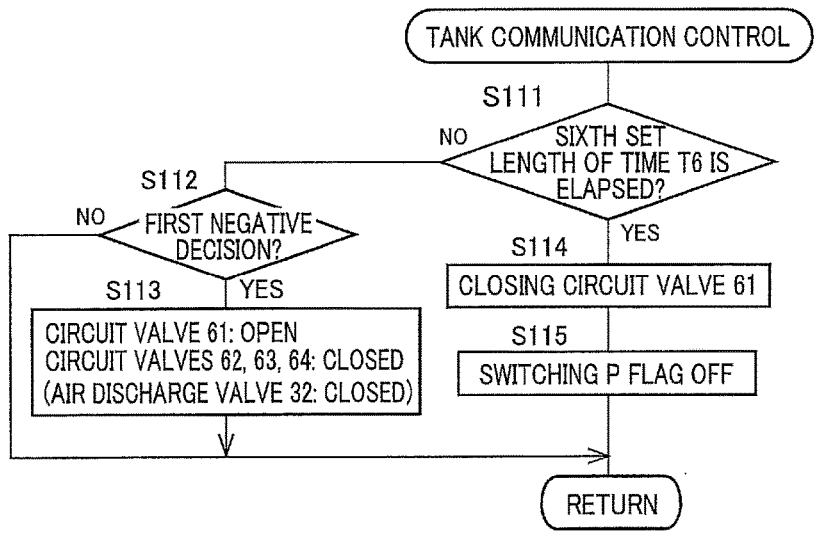
FIG. 14B is a flow chart illustrating still another portion of the start/termination control program (S63)

The flow charts in FIGS. 14A and 14B represent the termination control of the vehicle height control (S66, S63). The flow chart in FIG. 14A begins with S101 at which it is determined whether a length of time (T4+T5), which is the sum of the fourth set length of time T4 and the fifth set length of time T5, is elapsed from the point in time when the CE flag is switched to ON. At S102, it is determined whether the fourth set length of time T4 is elapsed. Before the fourth set length of time T4 is elapsed, it is determined at S103 whether the current negative decision (NO) made at S102 is the first negative decision at S102. When the current negative decision made at S102 is the first negative decision at S102, this flow goes to S104. At S104, the circuit valves 61, 63 are opened, and the circuit valves 62, 64 are closed, so that the closed circuit 120 is formed. Also, the vehicle-height control valve 26 is closed. The compressor device 30 is operated in the closed circuit 120 to circulate air until the fourth set length of time T4 is elapsed from the point in time when the CE flag is switched to ON, in other words, from the point in time when the closed circuit 120 is formed. When the fourth set length of time T4 is elapsed, it is determined at S105 whether the current positive decision (YES) made at S102 is the first positive decision at S102. When the current positive decision made at S102 is the first positive decision at S102, the electric motor 42 is switched to OFF at S106. It is determined at S101 whether the fifth set length of time T5 is elapsed from the point in time when the electric motor 42 is switched to OFF, that is, the length of time (T4+T5), which is the sum of the fourth set length of time T4 and the fifth set length of time T5, is elapsed from the point in time when the closed circuit 120 is formed. When a positive decision (YES) is made at S101, the CE flag is switched to OFF at S107, and the P flag is switched to ON at S108.

Since the P flag is switched to ON, the processing at S63 is executed. The flow chart in FIG. 14B begins with S111 at which it is determined whether the sixth set length of time T6 is elapsed from the point in time when the P flag is switched to ON. Before the sixth set length of time T6 is elapsed, it is determined at S112 whether the current negative decision (NO) made at S111 is the first negative decision at S111. When the current negative decision made at S111 is the first negative decision at S111, the circuit valve 63 is closed at S113. In this state, only the circuit valve 61 is open, and the tank 34 is isolated from the fourth passage 66 and communicated with the third passage 65. It is determined at S111 whether the state in FIG. 6C is kept for the sixth set length of time T6. Before the sixth set length of time T6 is elapsed, the processings at S51, S57, S62, S111, and S112 are repeated. When the sixth set length of time T6 is elapsed, the circuit valve 61 is closed at S114, and the P flag is switched to OFF at S115.

Figure 15B:
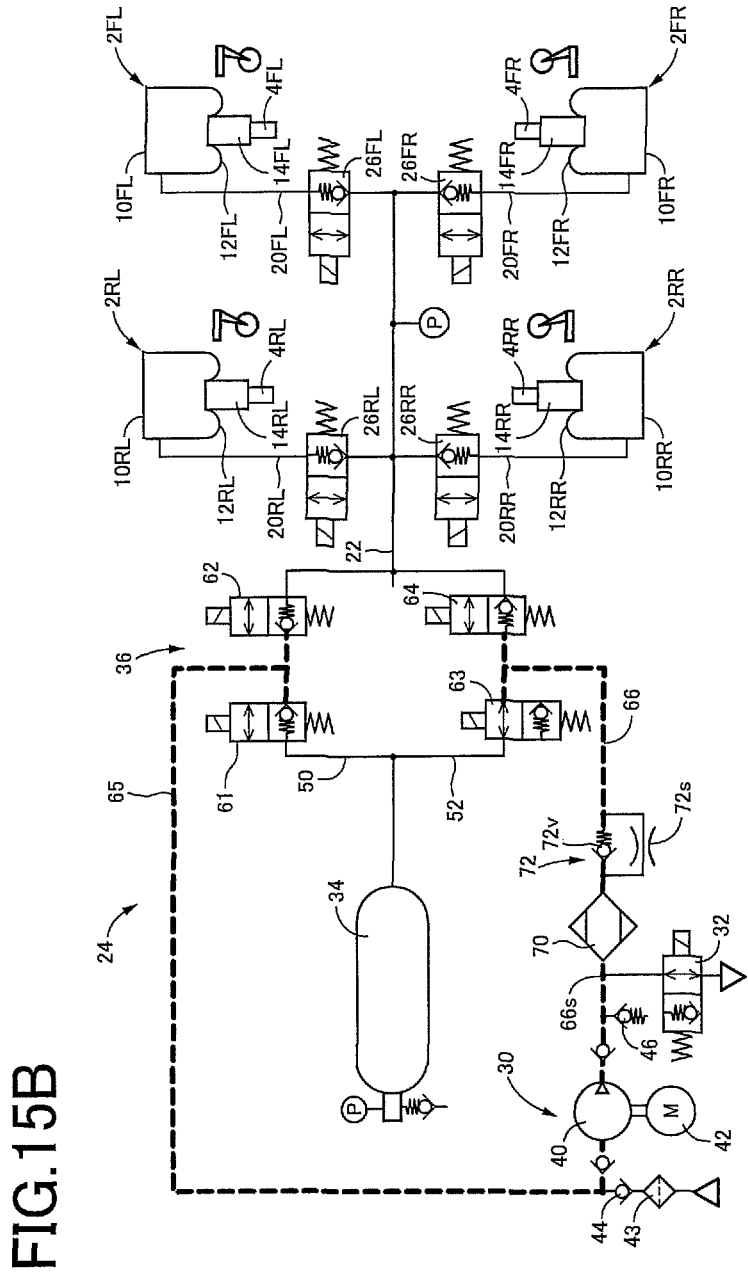
FIG. 15B is a view illustrating the low pressure portion at termination of the air discharge control.

There will be next explained the air discharge control. In the air discharge control, the compressor device 30 is not operated, and accordingly only the tank communication control as termination air supply control is executed without execution of start air supply control. In the case where the air discharge control is finished, the pressure of air in passages including the third passage 65 and the fourth passage 66 indicated by the broken lines in FIG. 15B is lower than or equal to the atmospheric pressure. In the air discharge control, the air discharge valve 32 is opened, and air in the tank 34 is released into the atmosphere via the air discharge valve 32. Thus, the pressure of air in the fourth passage 66 becomes substantially equal to the atmospheric pressure. Also, the third passage 65 and the fourth passage 66 are connected to each other via the compressor 40, the intake valve 40in, and the discharge valve 40out. Thus, when the air discharge valve 32 is opened, and the pressure of air in the fourth passage 66 becomes substantially equal to the atmospheric pressure, the pressure of air in the third passage 65 is also lowered substantially to the atmospheric pressure. Thus, in the tank communication control, the third passage 65 and the fourth passage 66 are one example of the low pressure portion.

When the termination instruction for the air discharge control is output (S59), the P flag is switched to ON (S61), and the tank communication control is executed (S63). The air discharge valve 32 is closed, the circuit valve 63 is closed, and the circuit valve 61 is opened to establish the state illustrated in FIG. 6C (S113). In this state, the tank 34 communicates with the third passage 65, so that air in the tank 34 is supplied to the low pressure portion (the third passage 65 and the fourth passage 66). The circuit valve 61 is closed (S114) after this state is maintained for the sixth set length of time T6. It is noted that the sixth set length of time T6 may be set to a longer time in the tank communication control for the air discharge control than in the tank communication control for the vehicle height control, i.e., the tank communication control executed after the circulation control.

Figure 8:
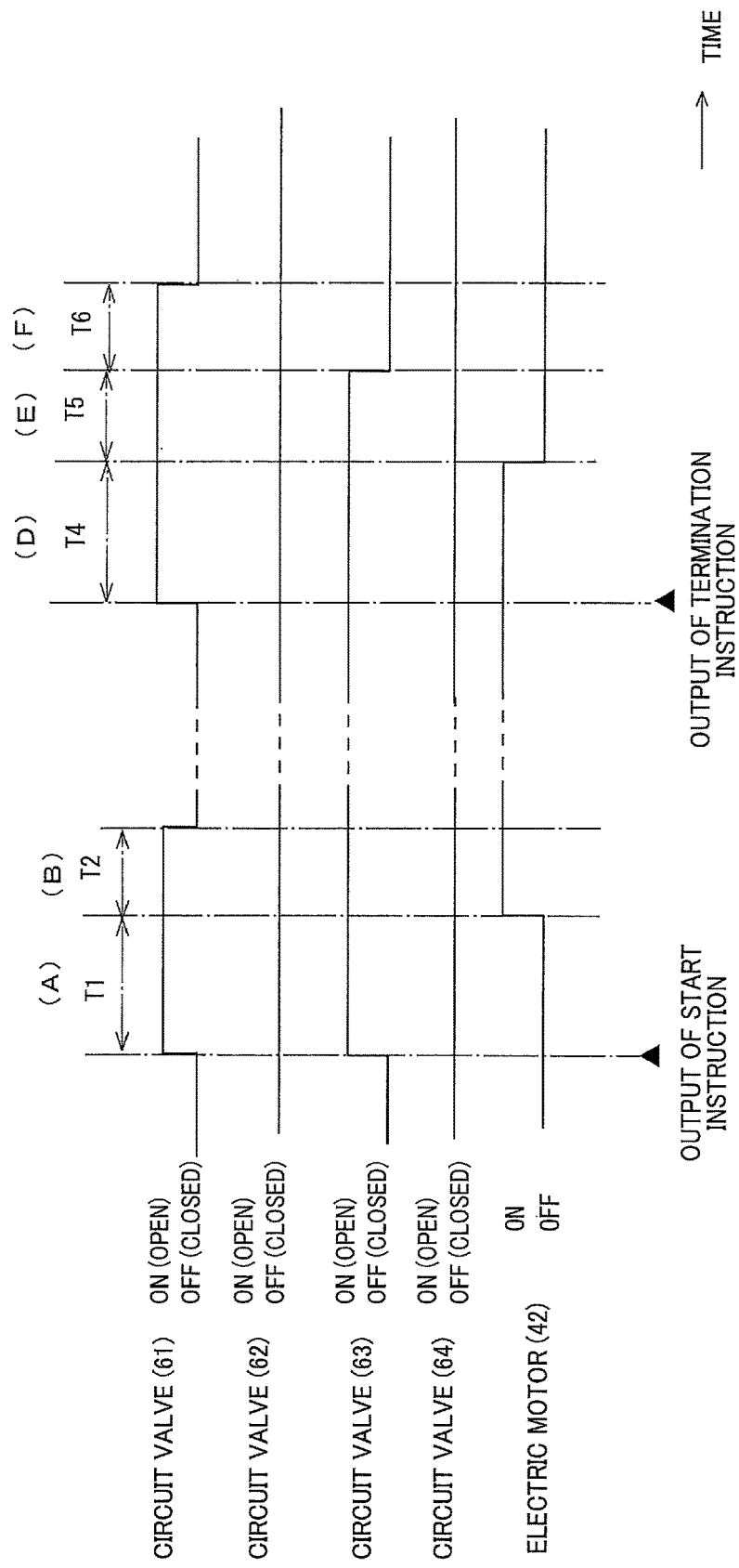
FIG. 8 is a time chart in the case where the start control and the termination control are executed in the air intake control.

There will be next explained the air intake control. In the air intake control, as illustrated in FIG. 8, the pressure-difference reduction control (see the period (A) in FIG. 8) and the stabilization waiting control (see the period (B) in FIG. 8) are executed in the start control. The preparation control is not necessary for the air intake control because the air intake control is executed in the state in which the vehicle-height control valve 26 is in the closed state. While illustration of a flow chart representing a start control routine for the air intake control is omitted, the processings at S86, S88, and S90-S92 are not necessary in the flow chart illustrated in FIG. 13, and when the second set length of time T2 is elapsed at S87 (S87: YES), the circuit valve 61 is closed, and the CS flag is switched to OFF at S89. Also, as illustrated in FIG. 8, the termination control for the air intake control is executed as in the termination control for the vehicle height control.

Figure 16:
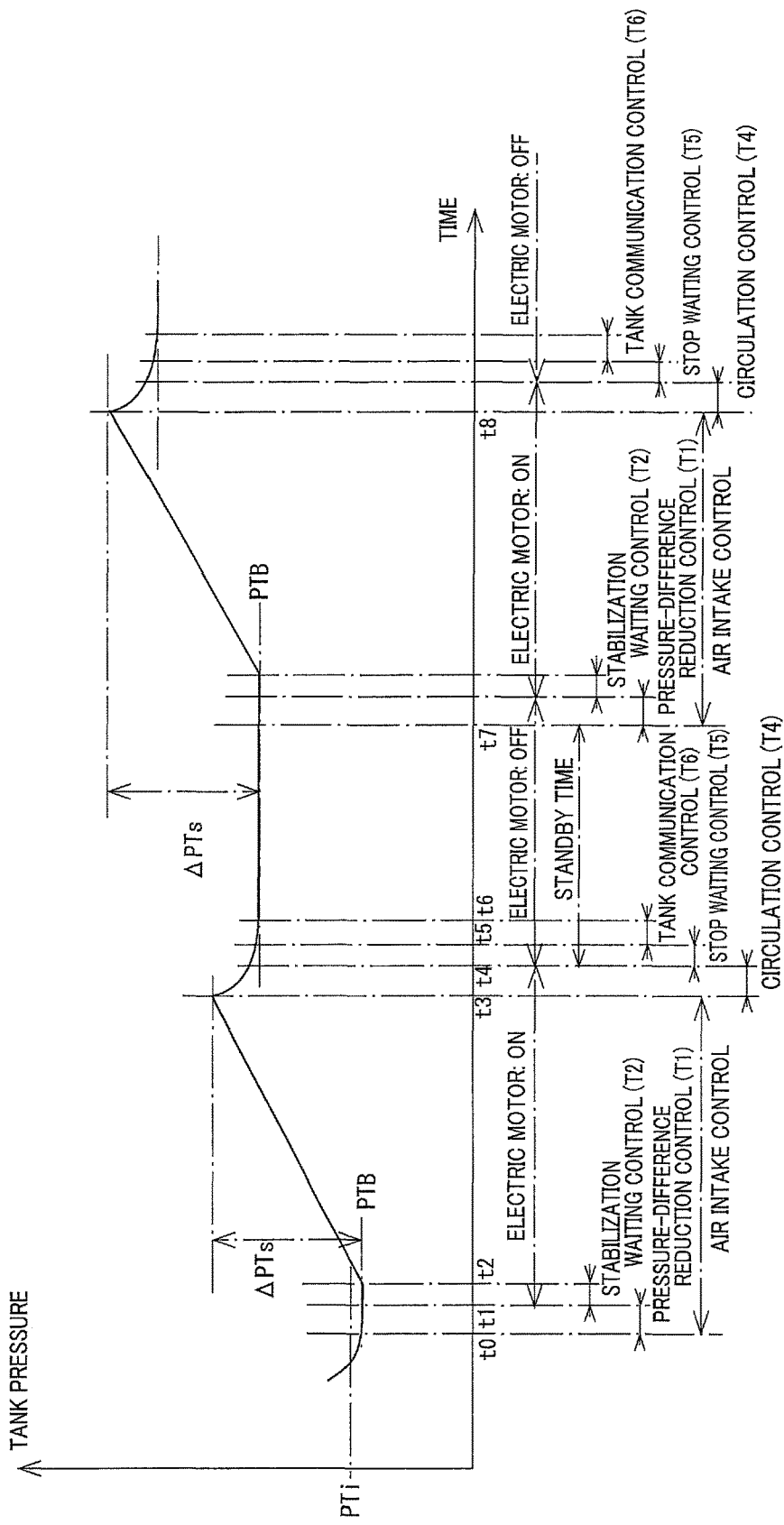
FIG. 16 is a view illustrating changes of a tank pressure in the case where the air intake control is executed in the vehicle-height control system.

FIG. 16 illustrates changes of the tank pressure in the case where the air intake control is executed. At time t0, when the tank pressure PT becomes lower than the air-intake start threshold value PT1, the start instruction is output (S36). In response, the closed circuit 120 is formed (S84) to establish the state illustrated in FIG. 5A. In this state, the pressure-difference reduction control is executed in the start control. When the first set length of time T1 is elapsed from the point in time when the start instruction is output, the electric motor 42 is switched to ON at time t1 (S85). The stabilization waiting control is then executed, and the closed circuit 120 is kept for the second set length of time T2. When the second set length of time T2 is elapsed, the circuit valve 61 is closed at time t2 to establish the state illustrated in FIG. 4A. Supply of air to the tank 34 increases the tank pressure. When the tank-pressure increase amount $\Delta$PT has reached the individual increase amount $\Delta$PTs at time t3, the terminating condition is satisfied (S38), and the termination instruction is output (S42). In response, the closed circuit 120 is formed (S104) to establish the state illustrated in FIG. 6A. In this state, the circulation control of the termination control is executed. When the fourth set length of time T4 is elapsed, the electric motor 42 is switched to OFF at time t4 (S106). When the fifth set length of time T5 is elapsed, the tank 34 is isolated from the fourth passage 66 and communicated with the third passage 65 at time t5 (S113). The state illustrated in FIG. 6C is established, and the tank communication control is executed. Since air in the tank 34 is supplied to the closed circuit 120 in the circulation control, the stop waiting control, and the tank communication control, the tank pressure lowers, but the pressure of air in the closed circuit 120 is made substantially equal to the tank pressure. When a length of time elapsed from time t5 has reached the sixth set length of time T6 at time t6 (S111), the tank communication control is terminated, and the circuit valve 61 is closed (S114).

When a length of time of the OFF state of the electric motor 42 from time t4 has reached the standby time (S43), the start instruction for the air intake control is output at time t7 (S36), and the pressure-difference reduction control and other controls are executed in the start control. The tank pressure is thereafter increased by operation of the compressor device 30. When the tank-pressure increase amount $\Delta$PT has reached the individual increase amount $\Delta$PTs (S38), and the termination instruction is output (S42), the termination control is executed again at time t8 (S66, S63). Thereafter, the air intake control (including the start control), the termination control, and the standby of the electric motor 42 are repeated in the same manner until the tank-pressure increase amount $\Delta$PT from time t0, i.e., the sum $\Sigma\Delta$PT of the tank-pressure increase amounts $\Delta$PT in the respective air intake controls reaches the target increase amount $\Delta$PTref (e.g., $\Delta$PTs×n) (S40). It is noted that, although the tank pressure lowers in the termination control, air in the tank 34 is not discharged to the outside of the vehicle-height control system. Thus, it is possible to consider that the sum $\Sigma\Delta$PT of the tank-pressure increase amounts $\Delta$PT in the respective air intake controls correspond to an amount of air supplied to the vehicle-height control system. Accordingly, the air intake control is repeated until the sum $\Sigma\Delta$PT of the tank-pressure increase amounts $\Delta$PT in the respective air intake controls reaches the target increase amount $\Delta$PTref. Also, since the termination air supply control is executed each time when the air intake control is finished, even in the case where the initiating condition for the up control is satisfied during standby of the compressor device 30, it is possible to well reduce a delay in the up control.

In the present embodiment as described above, the pressure-difference reduction control, the stabilization waiting control, and the preparation control are executed for the vehicle height control in the start control, and the pressure-difference reduction control and the stabilization waiting control are executed for the air intake control in the start control. It is possible to consider that the pressure-difference reduction control is one example of the start air supply control as start fluid supply control, and that each of the pressure-difference reduction control and the stabilization waiting control is one example of vibration suppressing control. Also, the circulation control, the stop waiting control, and the tank communication control are executed in the termination control for the vehicle height control and the air intake control. It is possible to consider that each of the circulation control, the tank communication control, and so on is one example of the termination air supply control as termination fluid supply control. It is also possible to consider that each of the circulation control and the stop waiting control is one example of the vibration suppressing control. It is noted that the tank communication control is not essential because the pressure of air in each of the third passage 65 and the fourth passage 66 is in some cases substantially equal to the tank pressure in the case where the circulation control and the stabilization waiting control are executed in the high-pressure closed circuit 120.

In the present embodiment, a first communication interrupter is constituted by components including the circuit valves 61, 63 and the high-pressure coupling passage 68t, and a second communication interrupter is constituted by components including the first communication interrupter and the tank passage 48, for example. The closed circuit 120 is constituted by the third passage 65, the fourth passage 66, and the high-pressure coupling passage 68t. The connecting portion 48s of the tank passage 48 is one example of a tank connecting portion. A vehicle height controller is constituted by the vehicle height sensors 93 and portions of the vehicle-height control ECU 80 which store and execute the vehicle-height control program represented by the flow chart in FIG. 9, for example. An air discharge controller is constituted by the tank pressure sensor 90 and portions of the vehicle-height control ECU 80 which store and execute the air-discharge control program represented by the flow chart in FIG. 10, for example. An air intake controller as a tank replenishment controller is constituted by portions of the vehicle-height control ECU 80 which store and execute the air-intake control program represented by the flow chart in FIG. 11, for example. A tank pressure controller is constituted by the air discharge controller and the air intake controller. A start closed circuit former is constituted by a portion of the vehicle-height control ECU 80 which stores a portion of the processing at S58 in the flow chart in FIG. 12. A termination closed circuit former is constituted by a portion of the vehicle-height control ECU 80 which stores a portion of the processing at S66 in the flow chart in FIG. 12. A closed circuit former is constituted by the start closed circuit former and the termination closed circuit former. A second tank communication controller and a first tank communication controller are constituted by a portion of the vehicle-height control ECU 80 which stores the processing at S63 in the flow chart in FIG. 12, for example. A second tank communication controller and an intake passage communication controller are constituted by a portion of the vehicle-height control ECU 80 which stores portions of the processings at S63, S66 (a tank communication control routine in FIG. 22B), for example. A tank communication controller is constituted by the second tank communication controller, the first tank communication controller, the second tank communication controller, and the intake passage communication controller. A fluid supply controller is constituted by the closed circuit former and the tank communication controller, for example. A motor stopper is constituted by a portion of the vehicle-height control ECU 80 which stores the processing at S106, for example. A motor actuator is constituted by a portion of the vehicle-height control ECU 80 which stores the processing at S85, for example. The motor stopper for the air intake control also serves as a tank-replenishment-control stopper. The first set length of time T1 is one example of an actuation first set length of time. The second set length of time T2 is one example of an actuation second set length of time. The fourth set length of time T4 is one example of a termination first set length of time. The fifth set length of time T5 is one example of a termination second set length of time. A pressure source device is constituted by the air supply and discharge device 24, the fluid supply controller, and the tank pressure controller, for example.

It is noted that some specifications of the compressor device 30 enable the compressor device 30 to supply a target supply amount ΔPTref of air to the tank 34 by a single continuous operation. In this case, there is a low necessity of operating the compressor device 30 a plurality of times to supply the target supply amount ΔPTref of air to the tank 34. Also, the stabilization waiting control and the stop waiting control are not essential. Also, to increase the vehicle height, some specifications of the compressor device 30 enable the compressor device 30 to switch the electric motor 42 to OFF to stop the compressor device 30 before the actual vehicle height H* gets close to the target vehicle height Href, that is, it is possible to execute the up control a plurality of times to bring the actual vehicle height H* to the target vehicle height Href. Also in this case, the start air supply control and the termination air supply control may also be executed at output of the actuation instruction for actuating the compressor device 30 and at output of the stop instruction. Also, the circulation control as the termination air supply control is not essential. The execution of the tank communication control well reduces a delay in the next up control. Also, the tank communication control as the termination air supply control is not essential. It is possible to well suppress sounds and vibrations at stop of the compressor 40 without the tank communication control.

Second Embodiment

In the first embodiment, the circuit valves 62, 64 are closed, and the circuit valves 61, 63 are opened to form the closed circuit 120. In this second embodiment, the circuit valves 61, 63 are closed, and the circuit valves 62, 64 are opened to form a closed circuit 130. Since the closed circuit 130 does not include the tank connecting portion 48s, the closed circuit 130 may be referred to as "low-pressure closed circuit".

Figure 17A:
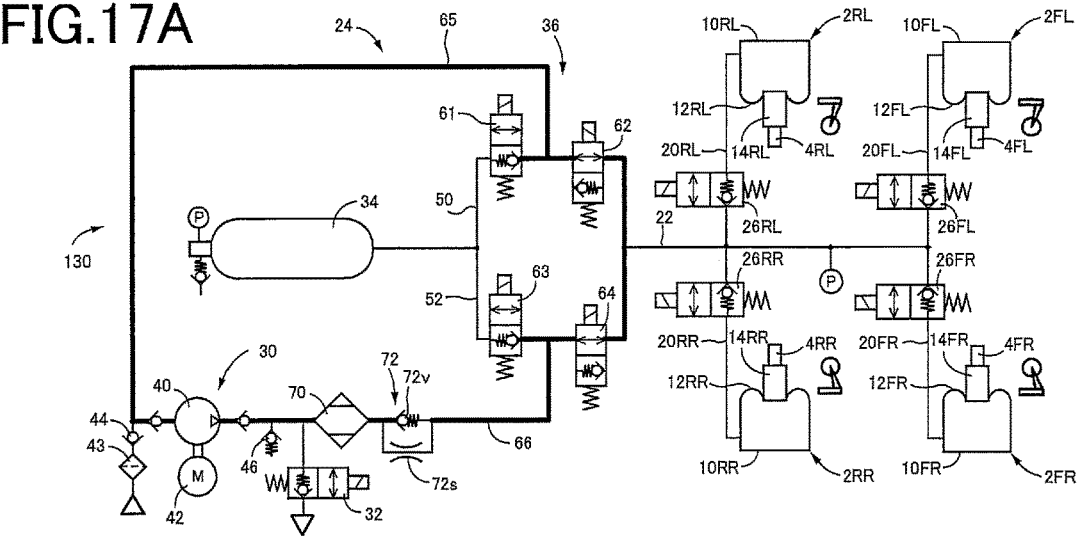
FIG. 17A is a view illustrating a state in which pressure-difference reduction control of start control is executed in a vehicle-height control system according to a second embodiment.
Figure 17B:
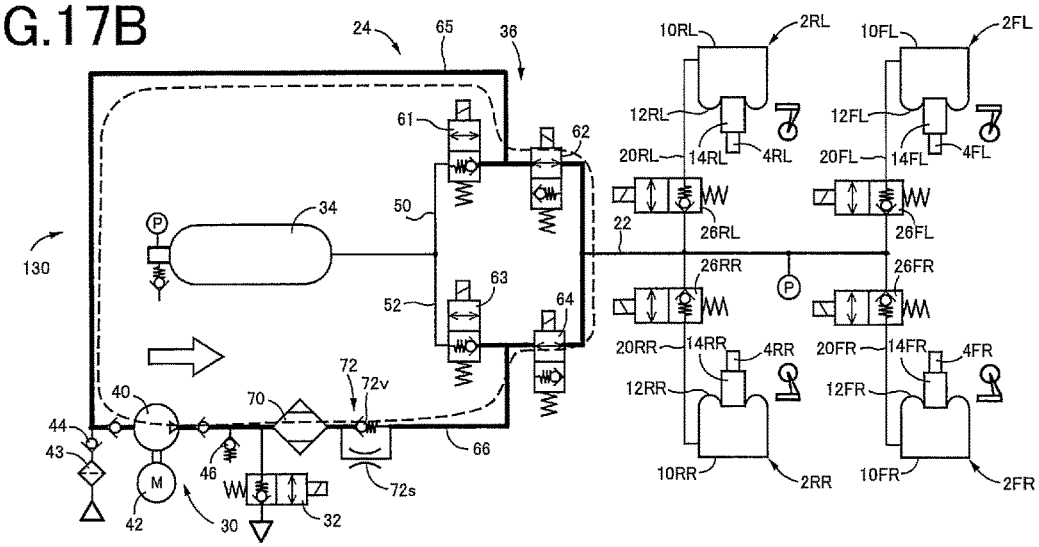
FIG. 17B is a view illustrating a state in which stabilization waiting control of the start control is executed in the vehicle-height control system.
Figure 17C:
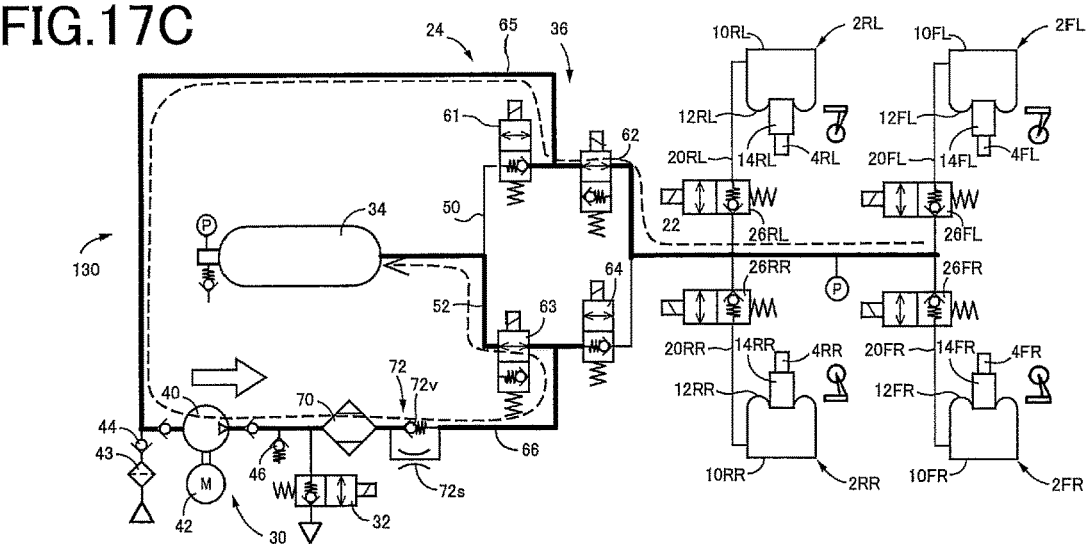
FIG. 17C is a view illustrating a state in which preparation control of the start control is executed in the vehicle-height control system.

There will be explained start control for vehicle height control in the second embodiment with reference to FIGS. 17A-17C and 19. Also in the present embodiment, as in the first embodiment, the pressure-difference reduction control, the stabilization waiting control, and the preparation control are executed in the start control. When the start instruction is output, the state illustrated in FIG. 17A is established. The circuit valves 62, 64 are opened, and the circuit valves 61, 63 are closed to form the closed circuit 130. This state is kept for a first set length of time T1* to reduce the pressure difference between the third passage 65 and the fourth passage 66 (see the period (A) in FIG. 19). When the first set length of time T1* is elapsed, the electric motor 42 is switched to ON, and this system waits for the stabilization (see FIG. 17B and the period (B) in FIG. 19). The preparation control is executed after the stabilization waiting control. In the down control, the circuit valve 64 is closed, and the circuit valve 63 is opened to establish the state illustrated in FIG. 17C. This state is kept for the third set length of time T3 (see the period (C) in FIG. 19).

Figure 21:
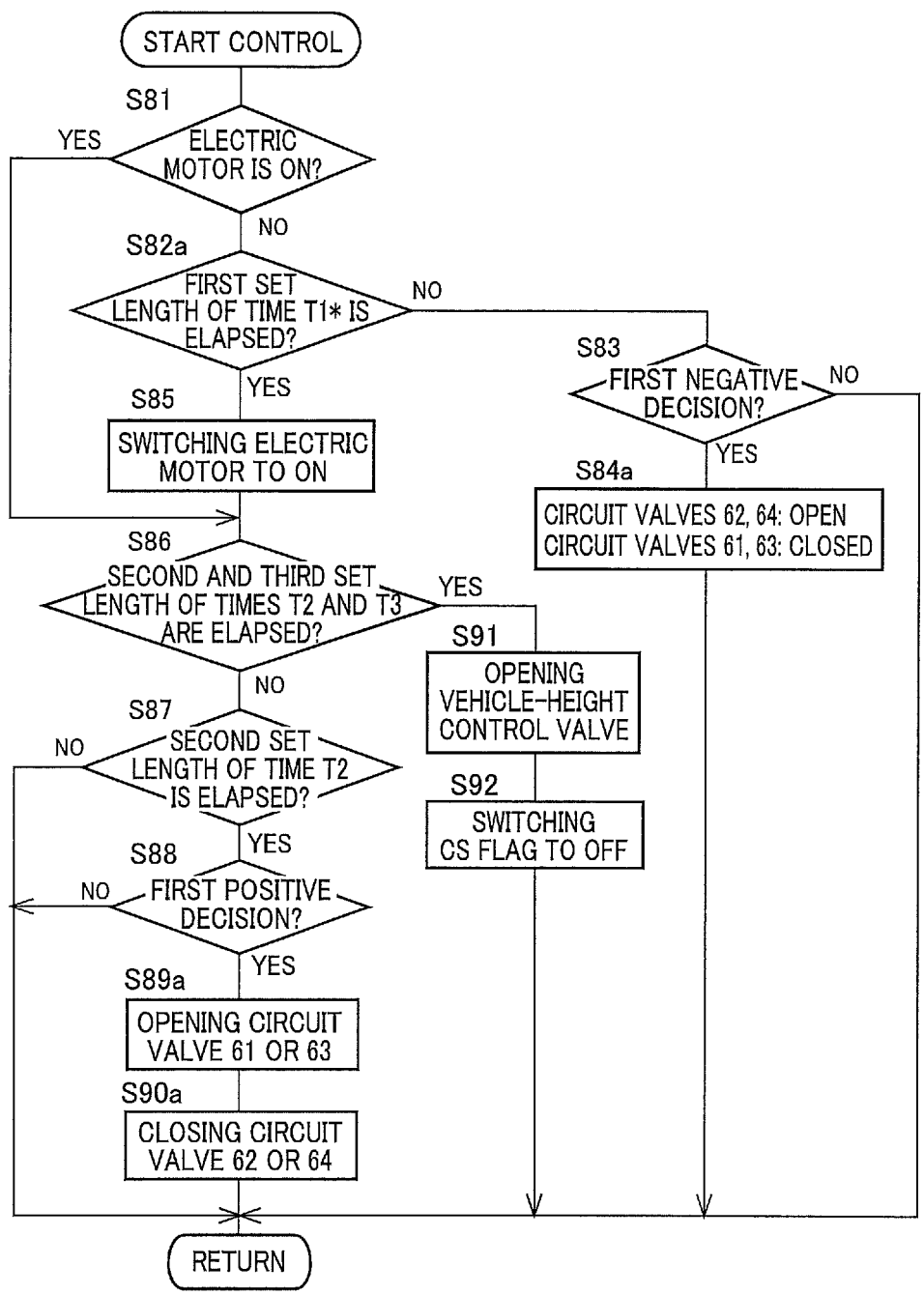
FIG. 21 is a flow chart illustrating a portion of the start/termination control program (S58)

The flow chart in FIG. 21 represents a start control routine. The same step numbers as used in the first embodiment will be used to designate the corresponding steps in the flow chart in FIG. 21, and descriptions of these steps will be omitted. At S84a, the circuit valves 61, 63 are closed, and the circuit valves 62, 64 are opened to form the closed circuit 130. When the closed circuit 130 is kept for the first set length of time T1* at S82a and S85, a positive decision (YES) is made at S82a, and the electric motor 42 is switched to ON. The first set length of time T1* is longer than the first set length of time T1 in the first embodiment. When the second set length of time is elapsed, one of the circuit valves 61, 63 is opened at S89a, and one of the circuit valves 62, 64 is closed at S90a, and the vehicle height control is prepared.

Figure 18A:
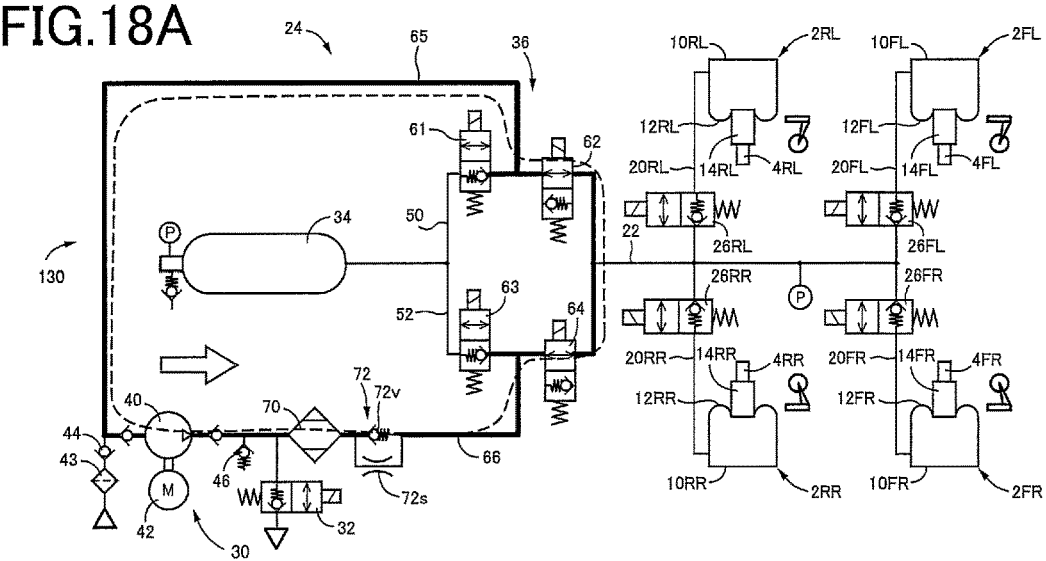
FIG. 18A is a view illustrating a state in which circulation control of termination control is executed in the vehicle-height control system.
Figure 18B:
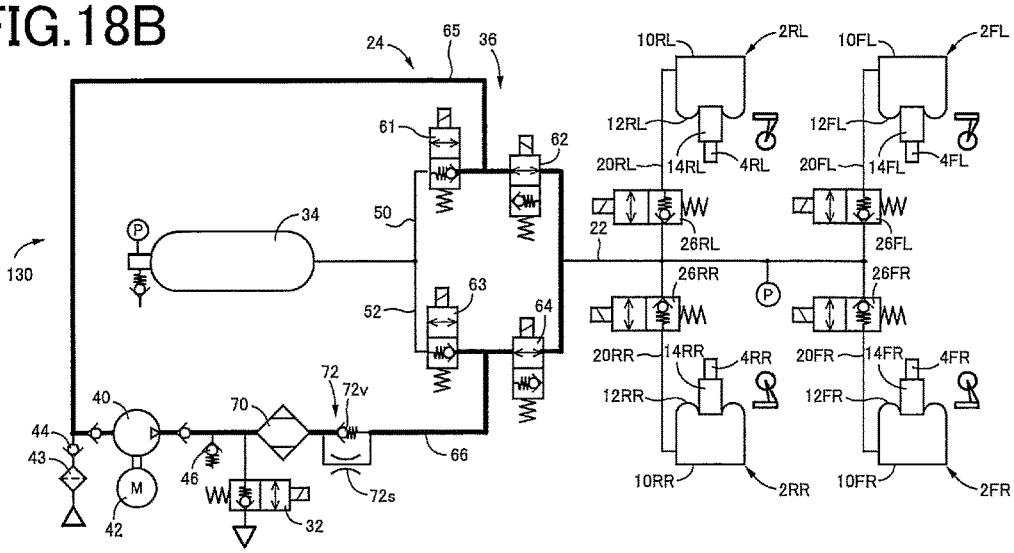
FIG. 18B is a view illustrating a state in which stop waiting control of the termination control is executed in the vehicle-height control system.
Figure 18C:
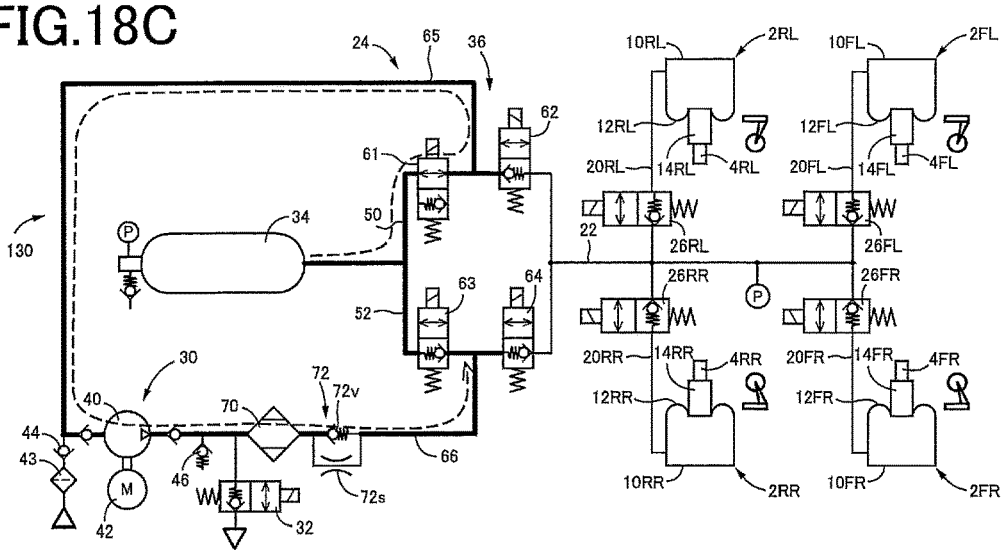
FIG. 18C is a view illustrating a state in which tank communication control of the termination control is executed in the vehicle-height control system.
Figure 19:
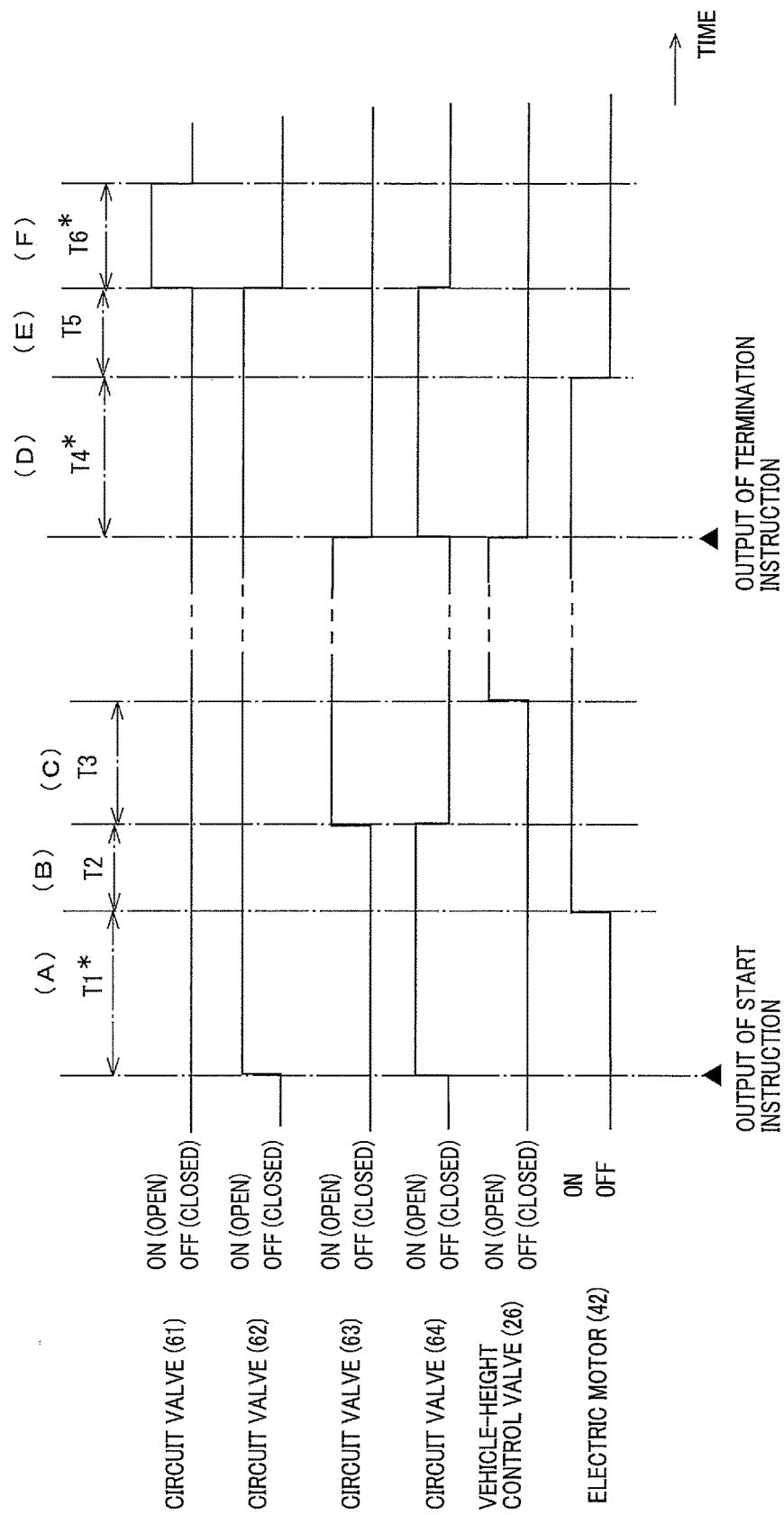
FIG. 19 is a time chart in the case where the start control and the termination control are executed in vehicle height control.

There will be next explained the termination control with reference to FIGS. 18A-18C and 19. Also in the present embodiment, the circulation control, the stop waiting control, and the tank communication control are executed in the termination control. When the termination instruction is output, as illustrated in FIG. 18A, the closed circuit 130 is formed. Air is circulated for a fourth set length of time T4* by operation of the compressor device 30 (see the period (D) in FIG. 19). When the fourth set length of time T4* is elapsed, the electric motor 42 is switched to OFF, and the state illustrated in FIG. 18B is kept for the fifth set length of time T5 (see the period (E) in FIG. 19). Then, the circuit valve 61 is opened, and the circuit valves 62, 64 are closed to establish the state illustrated in FIG. 18C. In this state, the tank communication control is executed. The tank communication control is executed for a sixth set length of time T6* (see the period (F) in FIG. 19). Since the closed circuit 130 does not include the tank connecting portion 48s, the sixth set length of time T6* is longer than the sixth set length of time T6 in the first embodiment.

Figure 22A:
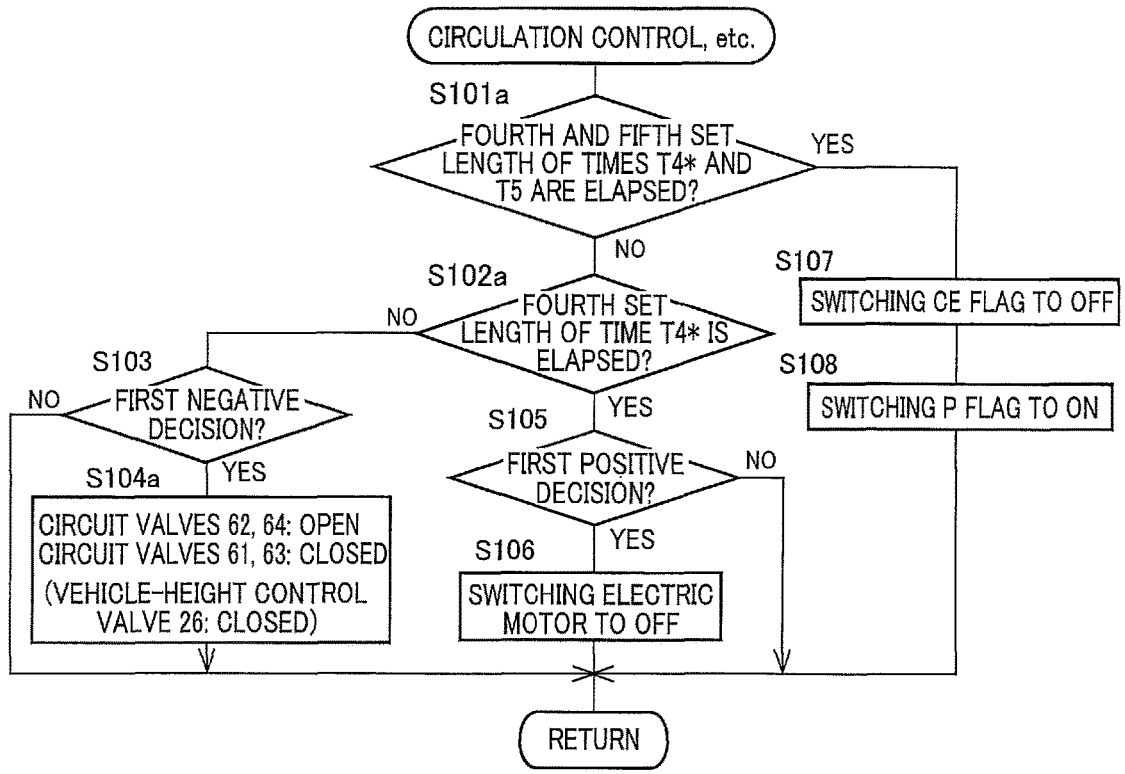
FIG. 22A is a flow chart illustrating another portion of the start/termination control program (S66)
Figure 22B:
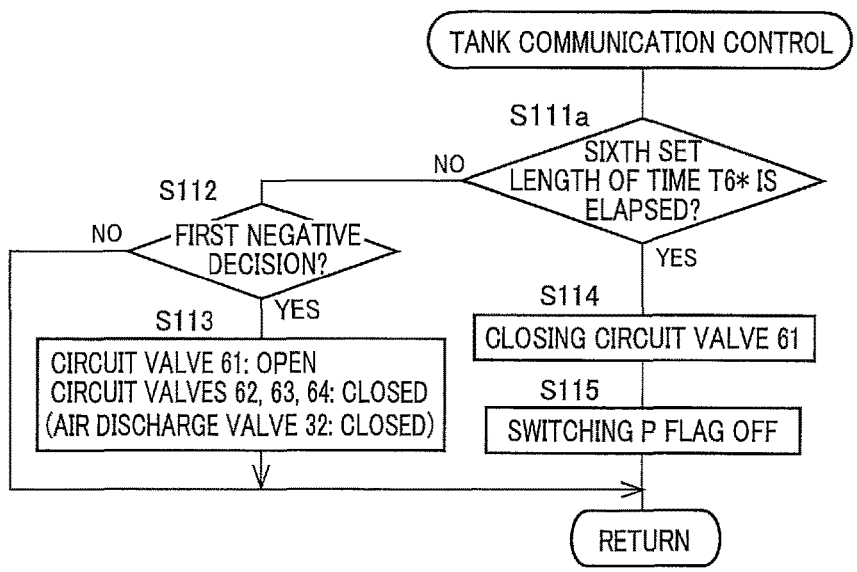
FIG. 22B is a flow chart illustrating still another portion of the start/termination control program (S63)

The flow charts in FIGS. 22A and 22B represent a termination control routine. The same step numbers as used in the first embodiment will be used to designate the corresponding steps in the flow chart in FIGS. 22A and 22B, and descriptions of these steps will be omitted. When the CE flag is switched to ON, the closed circuit 130 is formed at S104a. When the fourth set length of time T4* is elapsed, a positive decision (YES) is made at S102a, and the electric motor 42 is switched to OFF at S106. When the fifth set length of time T5 is thereafter elapsed, the circuit valves 62, 64 are closed, and the circuit valve 61 is opened at S113, so that the tank 34 communicates with the third passage 65. When the sixth set length of time T6* is elapsed, a positive decision (YES) is made at S111a, and the circuit valve 61 is closed.

Figure 20:
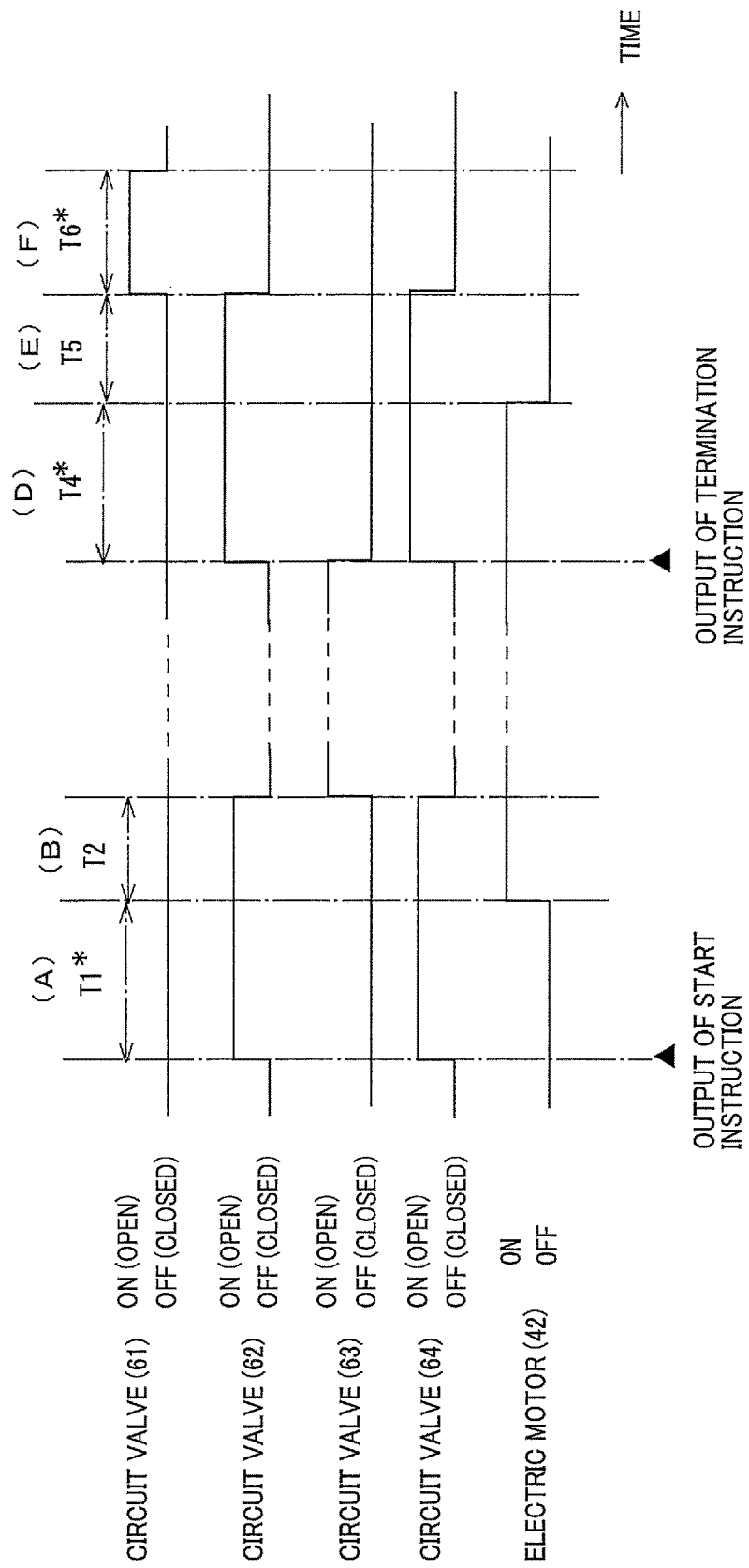
FIG. 20 is a time chart in the case where the start control and the termination control are executed in air intake control.

The air discharge control is similar to the air discharge control in the first embodiment. The sixth set length of time T6* for the air discharge control is substantially equal to the sixth set length of time T6 in the first embodiment (T6=T6*). In the air intake control, as illustrated in FIG. 20, the pressure-difference reduction control and the stabilization waiting control are executed in the start control, and the closed circuit 130 is formed in the pressure-difference reduction control. The termination control is executed as in the termination control for the vehicle height control.

In the present embodiment as described above, the low-pressure closed circuit 130 is formed in at start and/or termination of at least one of the vehicle height control and the tank pressure control. Thus, a load applied to the electric motor 42 is small when compared with the case where the high-pressure closed circuit 120 is formed. Also, it is possible to further well suppress sounds and vibrations caused at actuation and stop of the compressor 40 when compared with the case where the high-pressure closed circuit 120 is formed.

In the present embodiment, the first communication interrupter is constituted by the circuit valves 62, 64 and the low-pressure coupling passage 68b, for example. The second communication interrupter is one example of the first communication interrupter, the high-pressure coupling passage 68t, and the circuit valves 61, 63, for example. The closed circuit 130 is constituted by the third passage 65, the fourth passage 66, and the low-pressure coupling passage 68b, for example.

Third Embodiment

Figure 23:
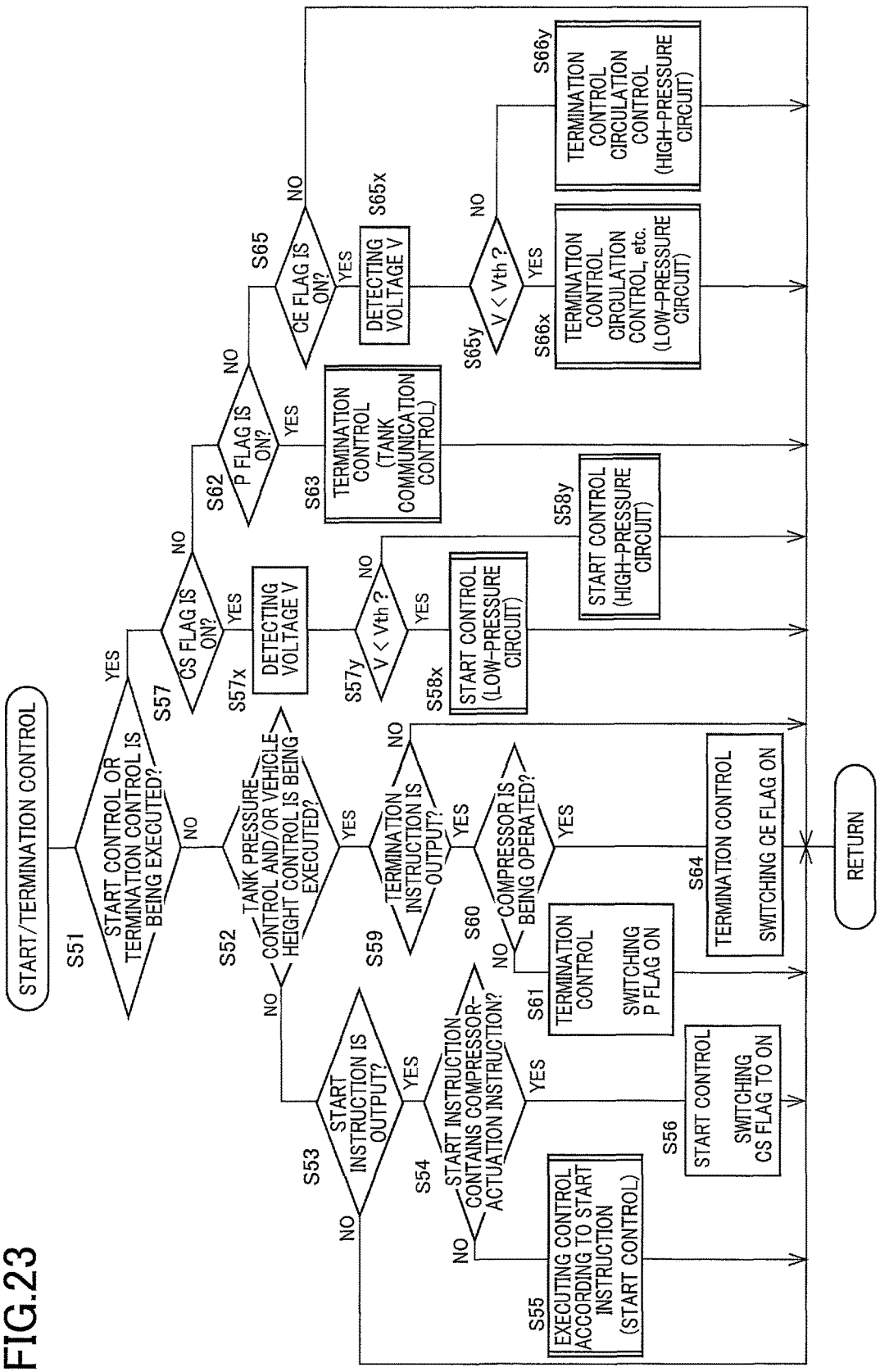
FIG. 23 is a flow chart illustrating a start/termination control program stored in a storage of a vehicle-height control ECU of a vehicle-height control system according to a third embodiment.

Ones of the start control, the circulation control, and other control in the first embodiment and the start control, the circulation control, and other control in the second embodiment may be selectively executed based on the power voltage of the battery 110. As described above, a larger load is applied to the compressor device 30 in the high-pressure closed circuit 120 than in the low-pressure closed circuit 130. Thus, the low-pressure closed circuit 130 is preferably formed in the case where the power voltage of the battery 110 is low. It is noted that the tank communication control is executed regardless of the power voltage of the battery 110 because the compressor device 30 is kept stopped. FIG. 23 illustrates the flow chart representing a start/termination control program in the present embodiment. When the CS flag is switched to ON, a positive decision (YES) is made at S57. Then, the power voltage V of the battery 110 is detected at S57x, and it is determined at S57y whether the power voltage V is lower than a set voltage Vth. When the power voltage V is lower than the set voltage Vth (V<Vth), the start control in the second embodiment is selected at S58x. When the low-pressure closed circuit 130 is formed, and the power voltage V is higher than or equal to the set voltage Vth (V≥Vth), the start control in the first embodiment is selected at S58y, and the high-pressure closed circuit 120 is formed. When the CE flag is switched to ON, likewise, the power voltage V is detected at S65x, and it is determined at S65y whether the power voltage V is lower than the set voltage Vth. When the power voltage V is lower than the set voltage Vth (V<Vth), the circulation control and other controls in the second embodiment (in which the low-pressure closed circuit 130 is formed) is selected at S66x. When the power voltage V is higher than or equal to the set voltage Vth (V≥Vth), the circulation control and other controls in the first embodiment (in which the high-pressure closed circuit 120 is formed) is selected at S66y. In view of the above, the first communication interrupter is constituted by the switching device 36 in the present embodiment, for example.

Fourth Embodiment

Figure 24:
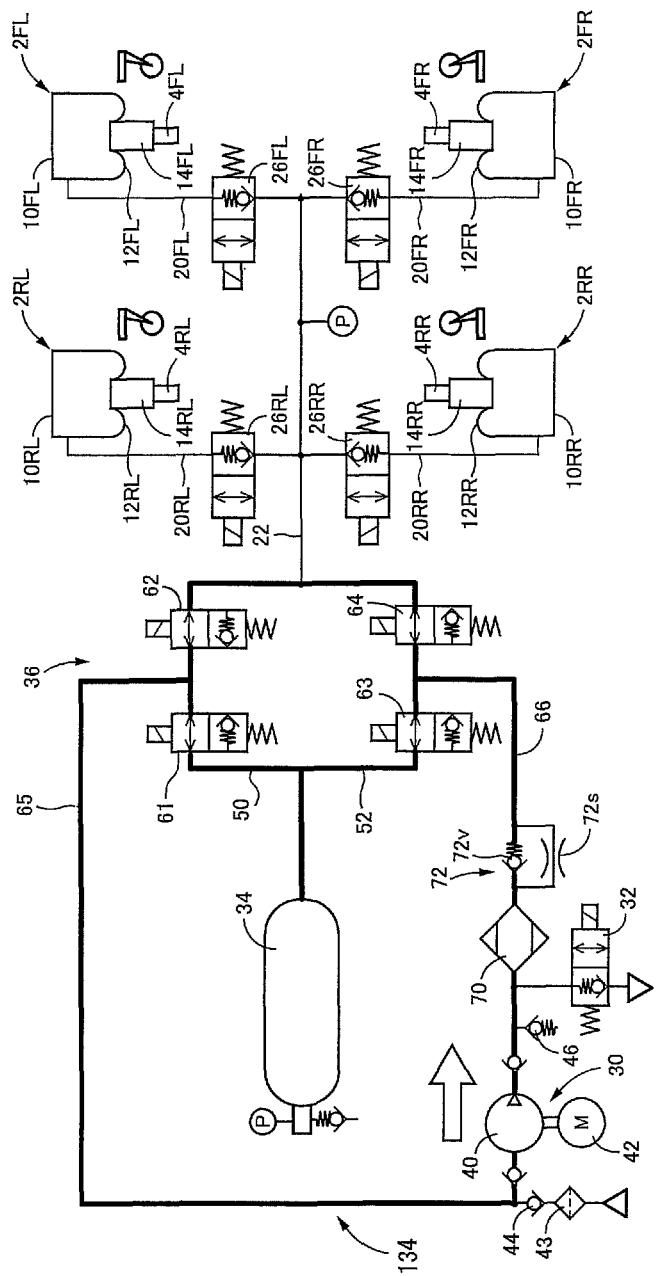
FIG. 24 is a view illustrating a closed circuit formed in start control and termination control in a vehicle-height control system according to a fourth embodiment.

It is noted that as illustrated in FIG. 24, all the circuit valves 61-64 may be open in the pressure-difference reduction control and the circulation control so as to form a closed circuit 134. In the present embodiment, not only the pressure of air in each of the third passage 65 and the fourth passage 66 but also the pressure of air in each of the first passage 50, the second passage 52, and the common passage 22 is made substantially equal to the tank pressure in the pressure-difference reduction control and the circulation control.

Both of the start air supply control and the termination air supply control are not necessarily executed in each of the tank pressure control and the vehicle height control. That is, the system may be configured such that any one of the start air supply control and the termination air supply control is executed, and the other is not executed. For example, in the case where the termination air supply control is executed, the start air supply control is not necessarily executed. Also, the termination air supply control is not necessarily executed at each of termination of the vehicle height control and termination of the tank pressure control. For example, the termination air supply control may be executed only for (i) control in which it is estimated that the difference in pressure of air between the third passage 65 and the fourth passage 66 becomes large at termination of the control and (ii) control in which a low pressure portion having the air pressure lower than or equal to a set pressure is estimated to be generated at termination of the control. Also, at least one of the start air supply control and the termination air supply control is not necessarily executed in each of the tank pressure control and the vehicle height control. For example, this system may be configured such that at least one of the start air supply control and the termination air supply control is executed for one of the tank pressure control and the vehicle height control, and neither of the start air supply control nor the termination air supply control is executed for the other of the tank pressure control and the vehicle height control. It is to be understood that the disclosure is not limited to the details of the illustrated embodiments, but may be embodied with various changes and modifications, which may occur to those skilled in the art, without departing from the spirit and scope of the disclosure. For example, the present disclosure may be applied to vehicle-height control systems and pressure source devices using working liquid as fluid and pressure medium.

Claimable Inventions

There will be described inventions that are claimable in the present application.

(1) A vehicle-height control system, comprising:

a fluid supply and discharge device comprising (i) a compressor device comprising a compressor and an electric motor configured to drive the compressor, and (ii) a tank configured to store fluid pressurized by the compressor device;

a vehicle-height control actuator provided so as to correspond to a wheel and connected to the fluid supply and discharge device;

a vehicle height controller configured to control a vehicle height for the wheel by controlling the fluid supply and discharge device to control supply and discharge of fluid to and from the vehicle-height control actuator;

a tank pressure controller configured to control a tank pressure which is a pressure of fluid stored in the tank; and a fluid supply controller configured to supply the fluid to a low pressure portion by controlling the fluid supply and discharge device at at least one of start and termination of at least one control of control executed by the vehicle height controller and control executed by the tank pressure controller, wherein the low pressure portion is a portion of the fluid supply and discharge device.

The supply of the fluid to the low pressure portion increases the pressure of the fluid in the low pressure portion and eliminates the low pressure portion. The fluid is supplied to the low pressure portion from a high pressure portion which is an area inside or outside the fluid supply and discharge device and at which the pressure of the fluid is higher than the pressure of the fluid at the low pressure portion. Examples of the high pressure portion include the tank and a discharge passage connected to a discharge-side portion of the compressor. The fluid supply controller controls opening and closing of, e.g., one or more electromagnetic valves of the fluid supply and discharge device to supply the fluid to the low pressure portion.

(2) The vehicle-height control system according to the above form (1), wherein the low pressure portion is at least one of (a) a portion of the fluid supply and discharge device at which the pressure of the fluid is lower than or equal to a set pressure and (b) a portion of the fluid supply and discharge device at which the pressure of the fluid is low relative to the other portion of the fluid supply and discharge device at at least one of start and termination of the at least one control.

Examples of the set pressure include the tank pressure, the atmospheric pressure, and a pressure higher than the atmospheric pressure by a particular pressure. There is a low necessity of detecting actual pressures of the fluid at a plurality of portions of the fluid supply and discharge device to determine the area and so on of the low pressure portion based on a result of the detection, for example. As described in "DETAILED DESCRIPTION OF THE EMBODIMENTS", it is possible to estimate the area and so on of the low pressure portion in some cases based on the operating state of the fluid supply and discharge device and environments, for example. Large sounds and vibrations are caused when the compressor is actuated in a state in which the difference in pressure of the fluid between an intake-side portion and a discharge-side portion of the compressor is large. It is known that the pressure difference between the intake-side portion and the discharge-side portion decreases with decrease in the pressure difference between the intake passage and the discharge passage. In contrast, in the case where sounds and vibrations are suppressed when the compressor is actuated after a closed circuit is formed by establishment of communication between the intake passage and the discharge passage, it is possible to estimate that the pressure difference between the intake-side portion and the discharge-side portion becomes smaller, in other words, it is possible to estimate that there are a low pressure portion and a high pressure portion before the formation of the closed circuit, and the fluid is supplied from the high pressure portion to the low pressure portion by the formation of the closed circuit including the intake passage and the discharge passage.

(3) The vehicle-height control system according to the above form (1) or (2), wherein the fluid supply controller comprises a termination fluid supply controller configured to supply the fluid to the low pressure portion at the termination of the at least one control of the control executed by the vehicle height controller and the control executed by the tank pressure controller.

The at least one control of the control executed by the vehicle height controller and the control executed by the tank pressure controller may be terminated in the case where one or more of the following conditions are satisfied: (a) the case where a terminating condition is satisfied at the at least one control of the control executed by the vehicle height controller and the control executed by the tank pressure controller or where the termination instruction is issued from at least one of the vehicle height controller and the tank pressure controller; (b) the case where supply and discharge of the fluid to and from the vehicle-height control actuator are stopped in the vehicle height control; (c) the case where supply and discharge of the fluid between the tank and an outside of the fluid supply and discharge device are stopped in the tank pressure control; and (d) the case where a stop condition for stopping the compressor device is satisfied or where an stop instruction is output.

(4) The vehicle-height control system according to any one of the above forms (1) through (3), wherein the fluid supply controller comprises a start fluid supply controller configured to supply the fluid to the low pressure portion at the start of the at least one control of the control executed by the vehicle height controller and the control executed by the tank pressure controller.

The at least one control of the control executed by the vehicle height controller and the control executed by the tank pressure controller may be started in the case where an initiating condition for the control is satisfied or in the case where a start instruction is output, for example.

(5) The vehicle-height control system according to any one of the above forms (1) through (4), wherein the fluid supply and discharge device comprises: an intake passage connected to an intake-side portion of the compressor; a discharge passage connected to a discharge-side portion of the compressor; and a first communication interrupter provided between the intake passage and the discharge passage and configured to establish communication and isolation between the intake passage and the discharge passage, and wherein the fluid supply controller comprises a closed circuit former configured to control the first communication interrupter to form a closed circuit comprising the compressor, the intake passage, and the discharge passage.

It is possible to consider that the intake passage contains the low pressure portion. When the closed circuit is formed by establishment of communication between the discharge passage and the intake passage, the fluid is supplied from a high pressure portion to a low pressure portion in the closed circuit, resulting in reduction in difference in pressure of the fluid in the closed circuit. The first communication interrupter is provided between one end portion of the intake passage connected at the other end portion to the intake-side portion of the compressor, and one end portion of the discharge passage connected at the other end portion to the discharge-side portion of the compressor. For example, the first communication interrupter may contain: a coupling passage for coupling the intake passage and the discharge passage to each other; and one or more electromagnetic valves provided on the coupling passage. Communication and isolation between the intake passage and the discharge passage may be established by control of the one or more of the electromagnetic valves.

(6) The vehicle-height control system according to the above form (5), wherein the fluid supply controller comprises a circulation controller configured to circulate the fluid in the closed circuit.

For example, in the case where the closed circuit is formed before the compressor device is stopped, the fluid is circulated by operation of the compressor device. The fluid is circulated in the closed circuit also in the case where the compressor device is actuated after the closed circuit is formed.

(7) The vehicle-height control system according to the above form (5) or (6), wherein the closed circuit comprises a tank connecting portion connected to the tank. When the tank communicates with the closed circuit, the tank pressure lowers.

(8) The vehicle-height control system according to any one of the above forms (5) through (7), wherein the closed circuit former comprises a termination closed circuit former configured to form the closed circuit when the compressor device is in an operating state at the termination of the at least one control, and wherein the vehicle-height control system further comprises a motor stopper configured to turn off the electric motor when a termination first set length of time is elapsed from a point in time when the closed circuit is formed by the termination closed circuit former.

The electric motor is turned off after the closed circuit is kept for the termination first set length of time. The termination first set length of time may be set based on a length of time required for reduction in pressure difference in the closed circuit.

(9) The vehicle-height control system according to the above form (8), further comprising a termination closed-circuit maintainer configured to maintain the closed circuit until a termination second set length of time is elapsed from a point in time when the electric motor is stopped by the motor stopper.

Even when the electric motor is turned off, the compressor is operated by inertia and thereafter stopped. Since the closed circuit is maintained during operation of the compressor by inertia, generation of the pressure difference becomes difficult in the fluid supply and discharge device even when the fluid is pressurized and discharged by the operation of the compressor by inertia. Also, when compared with the case where the closed circuit is maintained, the compressor can be stopped smoothly, thereby further suppressing sounds and vibrations.

(10) The vehicle-height control system according to the above form (8) or (9), wherein the fluid supply and discharge device comprises a second communication interrupter provided between the tank and each of the intake passage and the discharge passage and configured to establish communication and isolation between the tank and each of the intake passage and the discharge passage, and wherein the fluid supply controller comprises a first tank communication controller configured to isolate the tank from the discharge passage and establish communication between the tank and the intake passage by controlling the second communication interrupter when the electric motor is turned off by the motor stopper.

The second communication interrupter may be provided among (i) one end portion of the intake passage connected at the other end portion to the intake-side portion of the compressor, (ii) one end portion of the discharge passage connected at the other end portion to the discharge-side portion of the compressor, and (iii) the tank. The tank is communicated with the intake passage and isolated from the discharge passage after the fluid is circulated in the closed circuit. The intake passage and the discharge passage are in most cases connected to each other via a check valve (e.g., an intake valve and a discharge valve of the compressor) that permits a flow of the fluid from the intake passage toward the discharge passage and inhibits a flow of the fluid from the discharge passage toward the intake passage. Thus, when the fluid is supplied from the tank to the intake passage, the fluid is also supplied to the discharge passage. That is, it is possible to consider that the tank substantially communicates with the intake passage and the discharge passage, and accordingly the pressure of fluid in each of the intake passage and the discharge passage can be made substantially equal to the tank pressure. It is noted that in the case where the pressure of the fluid in the intake passage is substantially equal to the tank pressure at the point in time of the establishment of the communication between the tank and the intake passage, no fluid is supplied from the tank to the intake passage. However, the communication between the tank and the intake passage makes it possible to estimate that the pressure of fluid in each of the intake passage and the discharge passage is substantially equal to the tank pressure.

(11) The vehicle-height control system according to any one of the above forms (5) through (10), wherein the closed circuit former comprises an actuation closed circuit former configured to form the closed circuit when an actuation instruction for actuating the compressor device is output at the start of the at least one control, and wherein the vehicle-height control system comprises a motor actuator configured to actuate the electric motor in a state in which the closed circuit is formed by the actuation closed circuit former.

The electric motor is actuated after the closed circuit is maintained for an actuation first set length of time. The actuation first set length of time may be a length of time enough to reduce the pressure difference between the intake-side portion and the discharge-side portion.

(12) The vehicle-height control system according to the above form (11), further comprising a start closed-circuit maintainer configured to maintain the closed circuit until an actuation second set length of time is elapsed from actuation of the electric motor by the motor actuator. The operation of the compressor device is not stable at start of its actuation, easily leading to vibrations of the compressor. In the case where the closed circuit is maintained, in contrast, sounds and vibrations are well suppressed when compared with the case where the closed circuit is not maintained.

(13) The vehicle-height control system according to any one of the above forms (1) through (12), further comprising a vibration suppressor configured to suppress vibration of the fluid supply and discharge device at at least one of start and termination of the at least one control.

Control from the formation of the closed circuit to opening of the closed circuit may be referred to as "vibration suppressing control". Sounds are also suppressed as well as the vibrations of the fluid supply and discharge device.

(14) The vehicle-height control system according to any one of the above forms (5) through (13), wherein the closed circuit former is configured to selectively form one of a high-pressure closed circuit and a low-pressure closed circuit based on a state of a power source configured to supply electric power to the fluid supply and discharge device, wherein the high-pressure closed circuit is a closed circuit comprising a connecting portion connected to the tank, and wherein the low-pressure closed circuit is a closed circuit not comprising the connecting portion connected to the tank.

When comparing the high-pressure closed circuit and the low-pressure closed circuit with each other, a larger load is applied to the compressor device in the case of the high-pressure closed circuit than in the case of the low-pressure closed circuit. Thus, the system may be configured such that the high-pressure closed circuit is formed when a power voltage is high, and large electric power can be supplied, and the low-pressure closed circuit is formed when the power voltage is low, and it is difficult to supply large electric power. A shorter time is required in the case of the high-pressure closed circuit than in the case of the low-pressure closed circuit to reduce the pressure difference between the intake passage and the discharge passage. Thus, the high-pressure closed circuit is formed at the start of the at least one control. Furthermore, sounds and vibrations can be suppressed more in the case of the low-pressure closed circuit than in the case of the high-pressure closed circuit. Also, when considering a possibility that the up control is to be executed next, the pressure of the fluid in the fluid supply and discharge device is preferably substantially equal to the tank pressure at the termination of the at least one control. In view of the above, the system may be configured such that the low-pressure closed circuit is formed at the start of the at least one control, and the high-pressure closed circuit is formed at the termination of the at least one control.

(15) The vehicle-height control system according to the above form (14), wherein the first communication interrupter comprises:

a high-pressure coupling passage configured to couple the intake passage and the discharge passage with each other with the tank connecting portion;

a low-pressure coupling passage configured to couple the intake passage and the discharge passage with each other by bypassing the tank connecting portion;

a high-pressure-side electromagnetic valve that is at least one electromagnetic valve provided on the high-pressure coupling passage; and a low-pressure-side electromagnetic valve that is at least one electromagnetic valve provided on the low-pressure coupling passage, and wherein the closed circuit former comprises an electromagnetic valve controller configured to control the high-pressure-side electromagnetic valve and the low-pressure-side electromagnetic valve to selectively form one of the high-pressure closed circuit and the low-pressure closed circuit.

(16) The vehicle-height control system according to any one of the above forms (1) through (15), wherein the fluid supply controller comprises a second tank communication controller configured to control the fluid supply and discharge device to establish communication between the low pressure portion and the tank when the compressor device is in a non-operating state at the termination of the at least one control.

(17) The vehicle-height control system according to the above form (16), wherein the fluid supply and discharge device comprises:

an intake passage connected to an intake-side portion of the compressor;

a discharge passage connected to a discharge-side portion of the compressor; and a second communication interrupter provided between the tank and each of the intake passage and the discharge passage and configured to establish communication and isolation between the tank and each of the intake passage and the discharge passage, wherein the low pressure portion comprises at least a portion of the intake passage, and wherein the second tank communication controller comprises an intake passage communication controller configured to control the second communication interrupter at the termination of the at least one control to isolate the tank from the discharge passage and establish communication between the tank and the intake passage.

It is possible to consider that the intake passage comprises the low pressure portion and that the intake passage, the discharge passage, and so on correspond to the low pressure portion, for example.

(18) The vehicle-height control system according to any one of the above forms (1) through (17), wherein the fluid supply and discharge device comprises: an intake passage connected to an intake-side portion of the compressor; and a discharge passage connected to a discharge-side portion of the compressor;

wherein the vehicle height controller is configured to, when an absolute value of a difference between an actual vehicle height for the wheel and a target vehicle height becomes greater than or equal to a set value, determine that an initiating condition is satisfied and output a start instruction for establish communication between the fluid supply and discharge device and the vehicle-height control actuator and actuating the compressor device, wherein the vehicle height controller is configured to, when the actual vehicle height has been brought close to the target vehicle height, determine that a terminating condition is satisfied and output a termination instruction for isolating the vehicle-height control actuator from the fluid supply and discharge device and stopping the compressor device, and wherein the fluid supply controller comprises at least one of: a start closed circuit former configured to, when the start instruction is output as at the start, form a closed circuit comprising the intake passage, the discharge passage, and the compressor in a state in which the fluid supply and discharge device and the vehicle-height control actuator are isolated from each other, and the compressor device is in a non-operating state; and a termination closed circuit former configured to, when the termination instruction is output as at the termination, form the closed circuit by isolating the vehicle-height control actuator from the fluid supply and discharge device in an operating state of the compressor device.

(19) The vehicle-height control system according to any one of the above forms (1) through (18), wherein the fluid supply and discharge device comprises: an intake passage connected to an intake-side portion of the compressor; a discharge passage connected to a discharge-side portion of the compressor; and an intake valve provided between the intake passage and an atmosphere which is an outside of the fluid supply and discharge device, wherein the tank pressure controller comprises an air intake controller configured to, when the tank pressure becomes lower than an air-intake start threshold value, output an start instruction comprising establishment of communication between the tank and the discharge passage, isolation of the tank from the intake passage, and actuation of the compressor device, and configured to, when an amount of increase in the tank pressure has reached a set increase amount, determine that a terminating condition is satisfied and output a termination instruction comprising a stop of the compressor device and isolation of the tank from the discharge passage, and wherein the fluid supply controller comprises at least one of: a start closed circuit former configured to, when the start instruction is output as at the start, form a closed circuit comprising the compressor, the intake passage, and the discharge passage in a non-operating state of the compressor device; and a termination closed circuit former configured to, when the termination instruction is output as at the termination, form the closed circuit in an operating state of the compressor device.

In the air intake control, the tank is isolated from the intake passage, thereby interrupting supply of the fluid from the tank to the intake passage. In the case where the intake valve is a mechanical valve which is opened and closed by a difference between the atmospheric pressure and the pressure of fluid in the intake passage, when the pressure of the fluid in the intake passage becomes lower than the atmospheric pressure by the operation of the compressor, the intake valve is opened, so that the fluid is sucked from the atmosphere. Since the pressure of the fluid in the intake passage becomes lower than the atmospheric pressure when the air intake control is finished, it is possible to consider that the intake passage corresponds to the low pressure portion and a fluid thin portion. It is noted that the termination instruction may be output when the tank pressure becomes higher than an air-intake termination threshold value determined based on the air-intake start threshold value and the set increase amount. In this case, the fluid is supplied from the discharge passage to the intake passage, so that the pressure of the fluid in the intake passage becomes higher than or equal to the atmospheric pressure, and the intake valve is closed.

(20) The vehicle-height control system according to any one of the above forms (1) through (19), wherein the fluid supply and discharge device comprises: an intake passage connected to an intake-side portion of the compressor; a discharge passage connected to a discharge-side portion of the compressor; and an air discharge valve provided between the discharge passage and an atmosphere which is an outside of the vehicle-height control system, wherein the tank pressure controller comprises an air discharge controller configured to, when the tank pressure becomes greater than an air-discharge start threshold value, output a start instruction for establishing communication between the discharge passage and the tank and opening the air discharge valve, and configured to, when the tank pressure becomes less than an air-discharge termination threshold value, output a termination instruction for instructing execution of a closing processing comprising isolation of the tank from the discharge passage and closing of the air discharge valve, wherein the low pressure portion comprises the intake passage, and wherein the fluid supply controller comprises an air-discharge-termination tank communication controller configured to isolate the tank from the discharge passage and establish communication between the tank and the intake passage when the termination instruction is output or when the closing processing is executed as at the termination.

In the air discharge control, the termination fluid supply control is executed without execution of the start fluid supply control because the compressor device is not operated. Also, the closed circuit is not formed because of a low necessity of forming the closed circuit to reduce the pressure difference.

When the air discharge valve is opened in the air discharge control, and thereby the pressure of the fluid in the discharge passage becomes substantially equal to the atmospheric pressure, the fluid flows from the intake passage to the discharge passage, so that the pressure of the fluid in the intake passage also becomes substantially equal to the atmospheric pressure. Thus, after the completion of the air discharge control, it is possible to consider that the intake passage and the discharge passage correspond to the low pressure portion, for example.

(21) A vehicle-height control system, comprising:

a fluid supply and discharge device comprising (i) a compressor device comprising a compressor and an electric motor configured to drive the compressor, (ii) an intake passage connected to an intake-side portion of the compressor, (iii) a discharge passage connected to a discharge-side portion of the compressor, and (iv) a tank configured to store fluid pressurized by the compressor device;

a vehicle-height control actuator provided so as to correspond to a wheel and connected to the fluid supply and discharge device;

a vehicle height controller configured to control a vehicle height for the wheel by controlling the fluid supply and discharge device to control supply and discharge of fluid to and from the vehicle-height control actuator;

a tank pressure controller configured to control a tank pressure which is a pressure of fluid stored in the tank; and a fluid supply controller configured to supply the fluid to at least the intake passage by controlling the fluid supply and discharge device at at least one of start and termination of at least one control of control executed by the vehicle height controller and control executed by the tank pressure controller.

The vehicle-height control system according to this form may include the technical features according to any one of the above forms (1) through (20).

(22) A pressure source device, comprising:

a tank configured to store a pressure medium;

a compressor device comprising (i) a compressor configured to pressurize the pressure medium and supply the pressure medium to the tank and (ii) an electric motor configured to drive the compressor; and a tank replenishment controller configured to control the electric motor to supply a target supply amount of the pressure medium to the tank, wherein the tank replenishment controller comprises a tank-replenishment-control stopper configured to stop the electric motor at least once before the target supply amount of the pressure medium is supplied to the tank.

A continuous driving time is limited by some specifications of the compressor device. While the electric motor is turned on to operate the compressor device in order to supply the target supply amount of the pressure medium to the tank, it is difficult in some cases to supply the target supply amount of the pressure medium to the tank within a continuous driving time determined by the specification. To solve this problem, in the pressure source device according to this form, the air intake control is executed a plurality of times. That is, the electric motor is turned on and off to perform operations and stops of the compressor device so as to supply the fluid such that the sum of amounts (individual supply amounts) of the pressure medium supplied to the tank during the operations of the compressor device becomes larger than or equal to the target supply amount. It is possible to consider that control for supplying the pressure medium to the tank in one operation of the compressor device is referred to as the tank replenishment control, and the tank replenishment control is executed a plurality of times until the target supply amount of the pressure medium is supplied to the tank. It is also possible to consider that control for supplying the target supply amount of the pressure medium to the tank from the first actuation of the compressor device is referred to as the tank replenishment control, and the electric motor is turned off at least once during the control to suspend the operation of the compressor device. The former consideration is employed in this specification. The pressure source device according to this form may include the technical features according to any one of the above forms (1) through (21). Also, the pressure source device according to this form may include the fluid supply and discharge device according to any one of the above forms (1) through the form (21).

(23) The pressure source device according to the above form (22), further comprising a pressure difference reducer configured to, when a stop condition for stopping the compressor device by the tank-replenishment-control stopper is satisfied, reduce a pressure difference between an intake-side portion and a discharge-side portion of the compressor by forming a closed circuit comprising the intake-side portion and the discharge-side portion of the compressor.

(24) A pressure source device, comprising:
 a tank configured to store a pressure medium;
 a compressor device comprising a compressor and an electric motor configured to drive the compressor;
 an intake passage connected to an intake-side portion of the compressor;
 a discharge passage connected to a discharge-side portion of the compressor;
 a first communication interrupter provided between the intake passage and the discharge passage and configured to establish communication and isolation between the intake passage and the discharge passage; and
 a closed circuit former configured to, when at least one of an actuation instruction for actuating the compressor device and a stop instruction for stopping the compressor device is output, control the first communication interrupter to establish communication between the intake passage and the discharge passage to form a closed circuit comprising the compressor, the intake passage, and the discharge passage.

The pressure source device according to this form may include the technical features according to any one of the above forms (1) through (21). Also, the pressure source device according to this form may include the fluid supply and discharge device according to any one of the above forms (1) through the form (21).

(25) A pressure source device, comprising:
 a tank configured to store a pressure medium;
 a compressor device comprising a compressor and an electric motor configured to drive the compressor;
 an intake passage connected to an intake-side portion of the compressor;
 a discharge passage connected to a discharge-side portion of the compressor;
 a second communication interrupter provided between the tank and each of the intake passage and the discharge passage and configured to establish communication and isolation between the tank and each of the intake passage and the discharge passage;
 a tank pressure controller configured to control a tank pressure such that the tank pressure falls within a set range, the tank pressure being a pressure of the pressure medium stored in the tank; and
 a tank communication controller configured to control the second communication interrupter to isolate the tank from the discharge passage and establish communication between the tank and the intake passage in a non-operating state of the compressor device after completion of control of the tank pressure controller.

The tank communication controller may include the second tank communication controller and a portion of the first tank communication controller. The pressure source device according to this form may include the technical features according to any one of the above forms (1) through (21). Also, the pressure source device according to this form may include the fluid supply and discharge device according to any one of the above forms (1) through the form (21).

What is claimed is:
1. A vehicle-height control system, comprising:
 a fluid supply and discharge device including:
  a compressor device having a compressor and an electric motor configured to drive the compressor,
  a tank configured to store fluid pressurized by the compressor device;
  an intake passage connected to an intake-side portion of the compressor,
  a discharge passage connected to a discharge-side portion of the compressor, and
  a first communication interrupter provided between the intake passage and the discharge passage and configured to establish communication and isolation between the intake passage and discharge passage;
 a vehicle-height control actuator provided so as to correspond to a wheel and connected to the fluid supply and discharge device;
 a vehicle height controller configured to control a vehicle height for the wheel by controlling the fluid supply and discharge device to control supply and discharge of fluid to and from the vehicle-height control actuator;
 a tank pressure controller configured to control a tank pressure which is a pressure of fluid stored in the tank; and
 a fluid supply controller configured to supply the fluid to a low pressure portion by controlling the fluid supply and discharge device at a start or termination of at least one control operation that is executed by the vehicle height controller and executed by the tank pressure controller, wherein:
 the low pressure portion is at least a portion of the fluid supply and discharge device including the intake passage, and
 the fluid supply controller comprises a closed circuit former configured to control the first communication interrupter at a start or termination of the at least one control operation to form a closed circuit having the compressor, the intake passage, and the discharge passage.

2. The vehicle-height control system according to claim 1, wherein the closed circuit comprises a connecting portion connected to the tank.

3. The vehicle-height control system according to claim 1, wherein the closed circuit former comprises a termination closed circuit former configured to form the closed circuit when the compressor device is in an operating state at the termination of the at least one control, and wherein the vehicle-height control system further comprises a motor stopper configured to turn off the electric motor after the closed circuit is formed by the termination closed circuit former.

4. The vehicle-height control system according to claim 3, wherein the fluid supply and discharge device comprises a second communication interrupter provided between the tank and each of the intake passage and the discharge passage and configured to establish communication and isolation between the tank and each of the intake passage and the discharge passage, and
 wherein the fluid supply controller comprises a first tank communication controller configured to isolate the tank from the discharge passage and establish communication between the tank and the intake passage by controlling the second communication interrupter after the electric motor is turned off by the motor stopper.

5. The vehicle-height control system according to claim 1, wherein the closed circuit former comprises an actuation closed circuit former configured to form the closed circuit when an actuation instruction for actuating the compressor device is output at the start of the at least one control, and wherein the vehicle-height control system comprises a motor actuator configured to turn on the electric motor according to the actuation instruction after the closed circuit is formed by the actuation closed circuit former.

6. The vehicle-height control system according to claim 1, wherein the fluid supply controller comprises a second tank communication controller configured to control the fluid supply and discharge device to establish communication between the low pressure portion and the tank when the compressor device is in a non-operating state at the termination of the at least one control.

7. The vehicle-height control system according to claim 6, wherein the fluid supply and discharge device comprises:
   an intake passage connected to an intake-side portion of the compressor;
   a discharge passage connected to a discharge-side portion of the compressor; and
   a second communication interrupter provided between the tank and each of the intake passage and the discharge passage and configured to establish communication and isolation between the tank and each of the intake passage and the discharge passage,
   wherein the low pressure portion comprises at least a portion of the intake passage, and
   wherein the second tank communication controller comprises an intake passage communication controller configured to control the second communication interrupter at the termination of the at least one control to isolate the tank from the discharge passage and establish communication between the tank and the intake passage.

8. The vehicle-height control system according to claim 1, wherein the closed circuit former is configured to selectively form one of a high-pressure closed circuit and a low-pressure closed circuit based on a state of a power source configured to supply electric power to the fluid supply and discharge device, wherein the high-pressure closed circuit is a closed circuit comprising the intake passage, the discharge passage, and a connecting portion connected to the tank, and wherein the low-pressure closed circuit is a closed circuit comprising the intake passage and the discharge passage and not comprising the connecting portion connected to the tank.

9. A pressure source device, comprising:
   a tank configured to store a pressure medium;
   a compressor device comprising a compressor and an electric motor configured to drive the compressor;
   an intake passage connected to an intake-side portion of the compressor;
   a discharge passage connected to a discharge-side portion of the compressor;
   a second communication interrupter provided between the tank and each of the intake passage and the discharge passage and configured to establish communication and isolation between the tank and each of the intake passage and the discharge passage;
   a tank pressure controller configured to control a tank pressure such that the tank pressure falls within a set range, the tank pressure being a pressure of the pressure medium stored in the tank; and
   a tank communication controller configured to control the second communication interrupter to isolate the tank from the discharge passage and establish communication between the tank and the intake passage in a state in which the electric motor is off after completion of control of the tank pressure controller.

* * * * *